(12) United States Patent
Oh et al.

(10) Patent No.: US 11,263,680 B2
(45) Date of Patent: Mar. 1, 2022

(54) KNOWLEDGE SHARING PLATFORM

(71) Applicants:Dong Suck Oh, Seoul (KR); Hyun Suck Oh, Seoul (KR)

(72) Inventors: Dong Suck Oh, Seoul (KR); Hyun Suck Oh, Seoul (KR)

( * ) Notice: Subject to any disclaimer, the term of this patent is extended or adjusted under 35 U.S.C. 154(b) by 181 days.

(21) Appl. No.: 16/530,188

(22) Filed: Aug. 2, 2019

(65) Prior Publication Data

US 2019/0362402 A1 Nov. 28, 2019

Related U.S. Application Data

(63) Continuation-in-part of application No. 15/220,311, filed on Jul. 26, 2016, now Pat. No. 10,373,228.

(51) Int. Cl.
*G06Q 30/00* (2012.01)
*G06Q 30/06* (2012.01)
*G06F 40/40* (2020.01)

(52) U.S. Cl.
CPC ......... *G06Q 30/0625* (2013.01); *G06F 40/40* (2020.01)

(58) Field of Classification Search
None
See application file for complete search history.

(56) References Cited

U.S. PATENT DOCUMENTS

| | | | |
|---|---|---|---|
| 7,343,328 B1 | 3/2008 | Smith et al. | |
| 7,840,509 B1 | 11/2010 | Messina | |
| 10,455,297 B1 * | 10/2019 | Mahyar | G10L 15/1815 |
| 2005/0076082 A1 | 4/2005 | Le Pennec et al. | |
| 2005/0203860 A1 | 9/2005 | D'Souza et al. | |
| 2007/0214032 A1 | 9/2007 | Sciuk | |
| 2009/0307159 A1 | 12/2009 | Pinckney et al. | |
| 2010/0205228 A1 * | 8/2010 | Reese | G06Q 30/02 707/805 |
| 2014/0161417 A1 * | 6/2014 | Kurupacheril | H04N 21/8456 386/241 |

(Continued)

FOREIGN PATENT DOCUMENTS

| | | |
|---|---|---|
| KR | 10-2004-0089418 | 10/2004 |
| KR | 10-2008-0068482 | 7/2008 |

(Continued)

OTHER PUBLICATIONS

Duan, Y. et al. "Web-based expert systems: benefits and challenges", Information & Management 42 (2005) 799-811. (Year: 2004).

(Continued)

*Primary Examiner* — Naeem U Haq
(74) *Attorney, Agent, or Firm* — Umberg Zipser LLP; Ryan Dean

(57) ABSTRACT

Disclosed is a non-transitory computer readable medium storing a computer program. The computer program performs operations for analyzing a video when the computer program is executed by one or more processors of a computing device and the operations may include: separating contents into one or more subcontents by analyzing the contents; matching and storing additional information with the subcontents; receiving search information from a user terminal; and sending at least one of the contents, the subcontents or the matched additional information corresponding to the search information to the user terminal.

18 Claims, 12 Drawing Sheets

(56) References Cited

U.S. PATENT DOCUMENTS

2015/0074112 A1 3/2015 Liu et al.
2016/0292512 A1* 10/2016 Kanna .................. G06K 9/6215
2017/0316085 A1 11/2017 Gupta et al.

FOREIGN PATENT DOCUMENTS

| KR | 101342454000 B1 | 7/2011 |
| KR | 10-2015-0079064 | 7/2015 |
| KR | 10-1843135000 B1 | 3/2018 |
| KR | 10-2019-0035464 | 4/2018 |

OTHER PUBLICATIONS

Englander, I., "The Architechtecture of Computer Hadrware, System Software, and Networking" Fourth Edition, Copyright © 2009 John Wiley & Sons, Inc. ISBN-13: 978-0471-71542-9 (Year: 2009).

* cited by examiner

FIG. 5

A re: : PROCEDURE AND KNACK FOR PURCHASING USED CAR    RECOMMENDING ANSWER
★★★★ (amsdkdh124860 | ANSWER ADOPTION RATE 37.9% | 20XX.0X.XX 12:36    👍 5

HI! THIS IS ★★★ USED CAR SALESMAN.

ANSWER FOR QUESTION IS AS FOLLOWS.

1. HONDA ACCORD 3.5 SEDAN 8-TH GENERATION (08.05/BLACK)(N/1950) WHETHER PRODUCTION YEAR AND THE NUMBER OF KILOMETERS ARE EXCELLENT COMPARED WITH PRICE
- IF 19.5 MILLION WON IS DEALING PRICE, IT IS PROPER PRICE.
PRICE OF RELEVANT VEHICLE MAY BE LOWER THAN DEALING PRICE.

2. PROCEDURE FOR PURCHASING USED CAR (PLEASE, DESCRIBE PROCEDURE IN DETAIL.)
(HOW MUCH AMOUNT OF MONEY I SHOULD PAY FOR PURCHASING USED CAR.)
(I AM SCHEDULED TO APPLY 1-YEAR COMPREHENSIVE INSURANCE. I AM MALE WHICH IS 21 YEARS OLD. I HAVE MILITARY DRIVING CAREER.)
- IF YOUR CAR IS NOT PRIVATE SALE, YOU SHOULD GO TO USED CAR DEALING COMPLEX. WHEN YOU GO TO DEALING COMPLEX, YOU SHOULD FIRST PREPARE CONTRACT AFTER CHECKING INTERIOR AND EXTERIOR OF VEHICLE, SUFFICIENTLY PERFORMING TEST-DRIVE, AND ACCURATELY RECEIVING NOTIFICATION OF WHETHER ACCIDENT OCCURS IN CORRESPONDING VEHICLE AND VEHICLE PERFORMANCE RECORD. IF YOU PAY VEHICLE PAYMENT, ACQUISITION/REGISTRATION TAX, AND USED CAR DEALING FEE (SELLING FEE, COMMISSION FEE, AND THE LIKE), USED CAR DEALING COMPLEX WILL DEPUTIZE VEHICLE TRANSFER. IN ASSOCIATION WITH INSURANCE, MILITARY DRIVING CARRIER DOES NOT APPLY TO YOU AND YOU WILL BE REGARDED AS NEW APPLICATION. WHEN YOU APPLY SELF-VEHICLE INSURANCE, INSURANCE PREMIUM WILL BE APPROXIMATELY 2 MILLION WON.

3. PLEASE, KNACK OR CAUTIONS FOR PURCHASING USED CAR.
- SINCE VEHICLE IS EXPENSIVE, YOU SHOULD CHECK VEHICLE WITH YOUR EYES, SUFFICIENTLY PERFORM TEST DRIVE, AND RECEIVE NOTIFICATION OF VEHICLE PERFORMANCE RECORD AND CAREFULLY CHECK WHAT ACCIDENT RANGE IS OR WHETHER VEHICLE IS COMPLETELY REPAIRED IF ACCIDENT OCCURS IN VEHICLE. I HOPE YOU TO PURCHASE BEST CAR.

KNOWLEDGE SHARING PLATFORM

CROSS-REFERENCE TO RELATED APPLICATIONS

This application claims priority under 35 U.S.C. § 120 and 37 CFR § 1.78, as a Continuation in Part application, to U.S. patent application Ser. No. 15/220,311, which was filed in the United States Patent and Trademark Office on Jul. 26, 2016, the contents of which are incorporated herein by reference, in their entirety, for all purposes.

TECHNICAL FIELD

The present disclosure relates to a transaction method on the Internet, and more particularly, to a method for providing a platform capable of transacting a product and a service based on knowledge.

BACKGROUND ART

In general, the Internet as an open network is configured to be arbitrarily connected and used by applying a common protocol called Transmission Control Protocol/Internet Protocol (TCP/IP) to a counterpart computer which everybody intends to access anywhere in the world can use various services such as e-mail, file transmission, World Wide Web (WWW), and the like which are used for transferring basic text information, developing a compression technique, and transferring multimedia information.

The importance of the Internet as a strategic tool for promoting efficiency and productivity throughout all fields of the existing industry has rapidly increased as the Internet is rapidly increasingly used worldwide including in Korea and new business opportunities through the Internet have been continuously created and areas of business have tended to extend, and as a result, business operators using the Internet have gradually increased.

Mobile Internet using a cellular phone, a PDA, and an IMT2000 service has been rapidly increasingly used in recent years and the service has been explosively increased as fast as the initial increase speed of Internet users.

That is, in recent years, businesses through the Internet have repeated development to create a more improved new business model such as Avatar transaction and a question and answer type knowledge search service over business models including Internet search, shopping mall, an auction, and the like in an initial stage.

In the related art, Internet shopping malls are configured for each item or item category and consumers individually search information on the item and the service according to a process for purchase wants thereof to determine the item and the service and thereafter, satisfy the purchase wants by using a purchase site such as the shopping mall, or the like. However, the search time for determining the item and the service is long and it is difficult even to acquire information on a store. Further, since a purchase intention for a special sold item or service should be decided only on a limited site, there is a problem in that it is difficult to provide a definite criterion for comparing a price or the service.

Accordingly, the consumer can ask a question about such a complicated process on the Internet and perform such a purchase action according to an answer to the question.

SUMMARY OF THE INVENTION

The present disclosure has been made in an effort to provide additional knowledge for respective processes included in an answer in a knowledge service.

The present disclosure has also been made in an effort to easily search a desired item and knowledge only by a category and an object for information search without going through a complicated process in order to find an item and knowledge desired by a consumer.

An exemplary embodiment of the present disclosure provides a non-transitory computer readable medium storing a computer program. The computer program performs operations for analyzing contents when the computer program is executed by one or more processors of a computing device and the operations may include: separating contents into one or more subcontents by analyzing the contents; matching and storing additional information with the subcontents; receiving search information from a user terminal; and sending at least one of the contents, the subcontents or the matched additional information corresponding to the search information to the user terminal.

Another exemplary embodiment of the present disclosure provides a method for analyzing contents. The method may include: separating contents into one or more subcontents by analyzing the contents; matching and storing additional information with the subcontents; receiving search information from a user terminal; and sending at least one of the contents, the subcontents or the matched additional information corresponding to the search information to the user terminal.

Still another exemplary embodiment of the present disclosure provides a server for analyzing contents. The server may include: a processor including one or more cores; and a memory, in which the processor may be configured to separate contents into one or more subcontents by analyzing the contents; match and store additional information with the subcontents; receive search information from a user terminal; and send at least one of the contents, the subcontents or the matched additional information corresponding to the search information to the user terminal.

The present disclosure can provide additional knowledge for respective processes included in an answer in a knowledge service.

The present disclosure can easily search a desired item and knowledge only by a category and an object for information search without going through a complicated process in order to find an item and knowledge desired by a consumer.

BRIEF DESCRIPTION OF THE DRAWINGS

FIG. 5 illustrates a more detailed example of analysis of an answer according to an exemplary embodiment of the present disclosure.

DETAILED DESCRIPTION

Various exemplary embodiments and/or aspects are now disclosed with reference to drawings. In the following description, for description, multiple detailed matters are disclosed in order to help overall understanding of one or more aspects. However, those skilled in the art will recognize even that the aspect(s) can be executed without the detailed matters. In the following disclosure and the accompanying drawings, specific exemplary aspects of one or more aspects will be described in detail. However, the aspects are exemplary and some among various methods in principles of various aspects may be used and the descriptions are intended to include all of the aspects and equivalents thereof.

Further various aspects and features will be presented by a system which can include multiple devices, components, and/or modules. It should also be appreciated and recognized that various systems can include additional devices, components, and/or modules and/or that the various systems cannot include all of devices, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of hardware and software, or software.

The term "or" is intended to mean not exclusive "or" but inclusive "or". That is, when not separately specified or not clear in terms of context, the case where "X uses A or B" is intended to mean one of natural inclusive substitutions. That is, in the case where "X uses A or B" may be applied to either of the case where X uses A, the case where X uses B, or the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or inclusion of one or more other features, components, and/or a group thereof is not excluded. Further, when not separately specified or not clear in terms of the context by indicating a singular form, it should be construed that the singular generally means "one or more" in the present specification and the claims.

Figure 1:
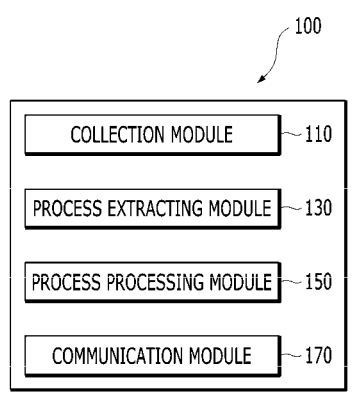
FIG. 1 is a block diagram of a server for providing knowledge based e-commerce according to an exemplary embodiment of the present disclosure.

FIG. 1 is a block diagram of a server for providing knowledge based e-commerce according to an exemplary embodiment of the present disclosure.

The server 100 for providing knowledge based e-commerce according to the exemplary embodiment of the present disclosure includes one or more processors (not illustrated) and a memory (not illustrated) storing commands which may be executed by the processor and the processor may include a collection module 110, a process extracting module 130, a process processing module 150, a communication module 170, and a communication module 190.

The collection module 110 may collect a question and an answer for the question from a knowledge sharing platform. The knowledge sharing platform of the present disclosure may be a platform in which users may exchange information. The knowledge sharing platform of the present disclosure may be a platform in which the users provide at least one of a question or an answer. For example, the knowledge sharing platform may be a platform in which one user may upload contents (e.g., text, images, video, etc.) and other users may respond to the contents. According to an exemplary embodiment of the present disclosure, the contents that the user uploads to the knowledge sharing platform may include, for example, images, video, voice, text, and the like. The user who asks the question and the user who gives the answer in the knowledge sharing platform may be one user or two or more different users.

The knowledge sharing platform of the present disclosure may be a platform of a type in which a user arbitrarily asks a question and an answerer arbitrarily answers a question. A plurality of unspecific users may make a question and perform the answer for the question by taking part and the questions and the answers are accumulated to be used as knowledge data. The knowledge sharing platform may be a knowledge sharing platform in which the answer is input to be separated for each process. For example, the knowledge sharing platform may be a platform that allows one user to upload the question and the answer or may be a platform that allows another user to upload the answer corresponding to the question when one user uploads the contents regarding the question. For example, the knowledge sharing platform may be a video sharing platform. The video sharing platform may allow videos related to the question and the answer to be uploaded. Alternatively, the video sharing platform may allow the videos related to the question or the answer to be uploaded and allow the question or the answer to be uploaded through a feedback (e.g., comments, expression of likes and dislikes about the video, etc.) for the uploaded video. The video sharing platform may allow various videos without a limit in format to be uploaded. For example, when a questioner questions a task which may be processed for each step, the answerer may make an answer for each step and the knowledge sharing platform may be a knowledge sharing platform which separates the answer for each process by a column and a partition so as to receive the answer for each step. Therefore, the collection module 110 may collect the answer separated for each process when collecting the answer separated by the column and the partition. For example, various contents may be uploaded to the knowledge sharing platform. For example, the videos may be uploaded to the knowledge sharing platform and the contents of the video may be a description of a specific task. For example, a video including the question or the answer may be uploaded for each step for a task which may be processed for each step or the question or the answer may be uploaded as the feedback for the uploaded video, to the knowledge sharing platform. For example, the knowledge sharing platform may display a time interval for the question or answer for each step in the video. For example, the knowledge sharing platform may allow an indication that the question and the answer for step A are performed from 0 minute and 50 seconds to 1 minute and 24 seconds of the video to be included in the video or an additional description of the video. Further, for example, the knowledge sharing platform may indicate for which step of question the corresponding answer is an answer (i.e., the indication that the question and the answer are performed from 0 minute and 50 seconds to 1 minute and 24 seconds of the video) at the time of uploading the answer as the feedback for the answer for step A included in the video. A disclosure associated with separating the answer for each process in the knowledge sharing platform described above is just an example and the answer may be received while being separated for each process by a predetermined method in the knowledge sharing platform. The collection module 110 may arbitrarily collect the questions of the users and the answers for the questions from the knowledge sharing platform. The knowledge sharing platform may be included in the server 100 according to the exemplary embodiment of the present disclosure. Further, the knowledge sharing platform may be included in a separate knowledge sharing server other than the server 100 of the present disclosure. The collection module 110 of the present disclosure may collect the questions and the answers of a knowledge sharing platform included in the server 100 and collect questions and answers of a knowledge sharing platform included in an external server. Further, the collection module 110 may collect questions and answers of the knowledge sharing platform which is present on the Internet and online. The questions and the answers according to the exemplary embodiment of the present disclosure may include at least contents associated with e-commerce. The contents associated with e-commerce may include contents associated with purchase, selling and manufacturing of items or purchasing and selling of services. A disclosure of the contents associated with e-commerce described above is just an example and the present disclosure may include contents associated with predetermined e-commerce.

The collection module 110 may collect the question or the answer in the knowledge sharing platform by using a deep learning algorithm. The collection module 110 may analyze the video including the question or answer uploaded to the knowledge sharing platform by using the deep learning algorithm and collect the analyzed video.

The collection module 110 may identify the contents uploaded to the knowledge sharing platform. The contents may be various information or contents for producing, processing, or distributing texts, codes, voice, sounds, images, videos, etc., in a digital scheme for use in wired and wireless telecommunication networks. For example, the contents uploaded to the knowledge sharing platform may include at least one of the video or query response texts as described above.

According to an exemplary embodiment of the present disclosure, the process extracting module 130 may separate contents into subcontents based on a context. For example, the process extracting module 130 may separate the videos based on the context of the video. For example, the process extracting module 130 may divide the video related to the task which may be processed for each process for each process. For example, the process extracting module 130 may separate the video including the question or answer for each process related to the task which may be processed for each step for each process. The process of the present disclosure may include, for example, each step of the task. For example, in a task of removing rust from a rusty tool, the process may be, for example, a chemical treatment step. In this case, for example, in the contents related to the task, the subcontents may include one or more processes. The aforementioned task and process are just an example and the present disclosure is not limited thereto. In the present disclosure, in the contents related to the task, the subcontents may be constituted by one or more processes for performing the task and the process may include one or more steps of the task.

The process extracting module 130 may divide the video into different steps based on a portion where the context of the contents included in the video is changed. The process extracting module 130 may determine that the context of the contents included in the video is changed, for example, based on a change of at least one object included in the video. The process extracting module 130 may divide the video before at least one object is changed and the video after at least one object is changed and determine the videos as different steps. The process extracting module 130 may analyze a similarity between pixels included in a first frame and pixels included in a second frame to determine that the context of the contents included in the video is changed if the similarity is less than a predetermined threshold value. For example, in the case of an answer video for a question for a cosmetic product, the process extracting module 130 may determine that a portion where a brush object appears and a portion where a blusher object appears a part correspond to the answers of different steps. A detailed description of the collection module is just an example and the present disclosure is not limited thereto.

According to an exemplary embodiment of the present disclosure, the process extracting module 130 may analyze the video by using a video analysis algorithm. For example, the process extracting module 130 may analyze the video including the question or answer by using a video processing algorithm or a voice processing algorithm.

For example, the process extracting module 130 may input the video uploaded to the knowledge sharing platform, identify at least one object included in the video, and separate the identified object from the video. The object separated from the video may be an object corresponding to the question or the answer. For example, when a lipstick of a specific brand is described by the answer in the question video for the cosmetic product, a lipstick object identified in the video may be collected as the answer. The video processing algorithm of the process extracting module 130 may include canny edge detection, Harris corner detection, and the like, but the present disclosure is not limited thereto. The process extracting module 130 performs blurring processing of the video through the canny edge detection to remove noise, detects an edge by using a mask edge, removes a Non-Maximum Value, and connects the edge by distinguishing a size with a double threshold to identify at least one object included in the video. The detailed description of the collection module is just an example and the present disclosure is not limited thereto.

According to an exemplary embodiment of the present disclosure, the process extracting module 130 may analyze the video including the question or answer by using a natural language processing algorithm. The process extracting module 130 may analyze a caption or voice included in the video using the natural language processing algorithm and collect the question or answer included in the video. The process extracting module 130 may analyze the feedback for the video and collect the question or answer. For example, the process extracting module 130 may analyze the comment of the video, which is the feedback for the video and collect the question or answer. The detailed description of the collection module is just an example and the present disclosure is not limited thereto. For example, the process extracting module 130 may separate the videos uploaded to the knowledge sharing platform for each step. For example, if the video is a video in which the rust is removed from the rusted tool, the process extracting module 130 may analyze the video and separate the video for each step for removing the rust. For example, when text information matches the video (e.g., a sandpaper step, a chemical treatment step, etc.), the process extracting module 130 may separate the video for each step based on the matching of the video and the text information. The aforementioned description is just an example and the present disclosure is not limited thereto.

The process extracting module 130 may extract a process for solving the question from the answer by analyzing the collected answer. An operation of extracting the process for solving the question from the answer according to an exemplary embodiment of the present disclosure may mean an operation of separating the answer into one or more processes and storing the separated processes in a storage space. For example, when the answer for the question includes contents for describing the process for solving the question, the process extracting module 130 may extract the process for solving the question from the answer by analyzing the collected answer. Further, the process extracting module 130 may determine a category of the collected answer and tag an object to the answer. In addition, the process extracting module 130 may determine a category of the collected question and tag the object to the question. For example, the process extracting module 130 may determine the category of the object corresponding to the question or answer contained in the video and tag the object on the object. Alternatively, the process extracting module 130 may determine the category of the question or answer included in the comments as the feedback for the video and tag the object on the question or answer included in the comment. An operation of tagging the object according to an exemplary embodiment of the present disclosure may mean an operation of matching the object corresponding to the question or answer with the question or answer and storing the matched object in the storage space. The detailed description of the process extracting module is just an example and the present disclosure is not limited thereto.

The process extracting module 130 may collect feedback information of the questioner for the answerer of each answer, determine reliability of the answerer based on the collected feedback information, extract a keyword by collecting an answer of an answerer in which the reliability is equal to or higher than a predetermined threshold, and separate the answer into one or more processes at least partially based on the extracted keyword. Collection according to an exemplary embodiment of the present disclosure may mean an operation of identifying data included in the knowledge sharing platform and separately storing the data in the storage space. In the knowledge sharing platform, the questioner may feed back whether the corresponding answer becomes the answer for the question with respect to the answer of the answerer. For example, when the answer of the answerer plays a decisive role in solving the question with respect to matters questioned by the questioner, the questioner may give a feedback such as high satisfaction or scoring with respect to the corresponding answer and answerer. The detailed description of the feedback is just an example and the present disclosure is not limited thereto.

The process extracting module 130 may identify the feedback information for the contents and determine the reliability of the contents based on the feedback information for the contents. The process extracting module 130 may separate contents having reliability equal to or higher than a predetermined threshold into the subcontents.

According to an exemplary embodiment of the present disclosure, the process extracting module 130 may check data in which the user who views the contents gives feedback such as affirmation (i.e., satisfaction) or denial (i.e., dissatisfaction) with respect to the contents. For example, the feedback may be data acquired by clicking on an interface object indicating affirmation or denial for the contents or data regarding the comments for the contents. For example, the process extracting module 130 may determine the reliability of the contents by analyzing the feedback, which is the data in which the user clicks on an interface object (i.e., feedback) for each of "like" or "dislike" for the contents. Further, the process extracting module 130 may determine the reliability of the contents by analyzing the comments (i.e., feedback) for the contents. For example, the process extracting module 130 may determine that the reliability of knowledge included in the contents is high when the number of affirmation feedbacks (e.g., indication of "like" for the video) for the contents is equal to or more than a predetermined threshold. Alternatively, the process extracting module 130 may determine that the reliability of the knowledge included in the contents is low when the number of denial feedbacks (e.g., indication of "dislike" for the video) for the contents is equal to or more than a predetermined threshold. The process extracting module 130 may determine the reliability of the knowledge included in the contents based on a ratio of the affirmation feedbacks and the denial feedbacks for the contents. The process extracting module 130 may determine the reliability of the knowledge included in the contents by analyzing the comments (i.e., feedback) for the contents. The process extracting module 130 may determine whether the feedback for the video is affirmation or denial based on a keyword included in the comments for the contents. The detailed description of the feedback is just an example and the present disclosure is not limited thereto.

According to an exemplary embodiment of the present disclosure, the process extracting module 130 may check data in which the user gives the feedback such as affirmation or denial with respect to the knowledge included in the comments for the contents. For example, an indication such as affirmation or denial for the comments on the contents may also be included in feedback data for determining the reliability of the contents. For example, the feedback may be data acquired by clicking on the interface object indicating affirmation or denial for the contents or data regarding the comments for the contents. For example, the process extracting module 130 may determine the reliability of the answer included in the comments for the contents by analyzing the feedback, which is the data in which the user clicks on the interface object (i.e., feedback) for each of "like" or "dislike" for the comments for the contents. The process extracting module 130 may determine the reliability of the answer included in the comments by analyzing the comments (i.e., feedback) for the comments for the contents. The process extracting module 130 may determine whether the feedback for the comments is affirmation or denial based on the keyword included in the comments for the comments. The detailed description of the feedback is just an example and the present disclosure is not limited thereto.

The process extracting module 130 collects the feedback information and determines the reliability of the answerer based on the feedback information. The reliability is determined for each answerer and the answerer for whom the reliability is equal to or higher than the threshold may be determined as an answerer who is reliable.

The process extracting module 130 may determine the reliability for a producer of the contents based on the feedback information for the producer of the contents. The process extracting module 130 may separate at least some of the contents of the producer having reliability which is equal to or more than a predetermined threshold into the subcontents. For example, the process extracting module 130 may collect the feedback information for each producer who uploads the contents and determine the reliability for the producer. Alternatively, the process extracting module 130 may collect the feedback information for each account of the knowledge sharing platform and determine the reliability for a user of the account. For example, when the process extracting module 130 determines that the reliability of the account user who uploads the video is high based on the feedback for the video, if the comments which the account user creates for another video include the answer, it may be determined that the reliability of the corresponding answer is high. The detailed description of the feedback is just an example and the present disclosure is not limited thereto.

The process extracting module 130 may extract a keyword or an object from the answers by collecting the answers of the reliable answerers. Additionally, for example, a fuzzy algorithm may be used for the keyword extraction and the process extracting module 130 may extract the keyword based on the fuzzy algorithm. The process extracting module 130 may extract the object based on the video processing algorithm. The process extracting module 130 may separate the answer into one or more processes at least partially based on the extracted keyword or object. The detailed description of the process extracting module is just an example and the present disclosure is not limited thereto.

According to an exemplary embodiment of the present disclosure, the process extracting module 130 may separate the answer into one or more processes at least partially based on the keyword and the number of repetition times of a keyword associated with the keyword in the answer. For example, when the question is associated with purchasing of a used car, the answer may be separated into processes including "a used car searching step", "a used car complex visiting step", "a vehicle checking step before a contract", "a contract step", "a transfer step", and the like. In this case, when keywords including "a service station", "an interior and an exterior", and the like are present with respect to vehicle checking, a sentence or paragraph including the corresponding keyword in the answer may be separated into the "checking step before the contract" process. The question, the answer, the process, and the keyword described above are just examples and the present disclosure includes a predetermined question, a predetermined answer, a predetermined process, and a predetermined keyword.

According to an exemplary embodiment of the present disclosure, the process extracting module 130 may separate the answer into one or more processes at least partially based on at least one object, a keyword corresponding to the object, or the number of repetition times of a keyword associated with the object in the answer. For example, when the question is associated with an overseas travel exit method, the contents including the answer for the question may be a video regarding an overseas travel exit process. In this case, the process extracting module 130 separates the objects included in the video to separate the processes into processes including "a check-in step" corresponding to an object for a check-in counter, "departure hall waiting step" corresponding to objects such as a passport, an airplane ticket, and a plurality of persons who stands in line, "a security check point passing step" corresponding to an object for a security check point, and "a departure examination step" corresponding to an object for recognition of a fingerprint, a face, and the passport. The question, the answer, the process, the keyword, and the object described above are just examples and the present disclosure includes a predetermined question, a predetermined answer, a predetermined process, a predetermined keyword, and a predetermined object.

The process extracting module 130 may collect feedback information for the answer, determine the reliability of the answer based on the collected feedback information, extract the keyword by collecting an answer in which the reliability is equal to or higher than a predetermined threshold, and separate the answer into one or more processes at least partially based on the extracted keyword. In the knowledge sharing platform, the questioner may feedback whether the answer becomes the answer for the question. For example, when the answer of the answerer plays a decisive role in solving the question with respect to matters questioned by the questioner, the questioner may give a feedback such as high satisfaction or scoring with respect to the corresponding answer. The process extracting module 130 collects the feedback information and determines the reliability of the answer based on the feedback information. The reliability is determined for each answer and an answer for which the reliability is equal to or higher than the threshold may be determined as an answer which is reliable. The process extracting module 130 may extract a keyword from the answers by collecting the reliable answers. Additionally, for example, a fuzzy algorithm may be used for the keyword extraction and the process extracting module 130 may extract the keyword based on a fuzzy algorithm.

Hereinafter, a method in which the processor extracting module 130 identifies contents having the reliability which is equal to or more than a threshold will be described.

According to an exemplary embodiment of the present disclosure, the process extracting module 130 may separate the contents having the reliability which is equal to or more than the threshold among the contents identified using the collection module 110 into one or more subcontents.

The process extraction module 130 may identify the feedback information for the contents. The process extracting module 130 may determine the reliability for the contents based on the feedback information.

Figure 11:
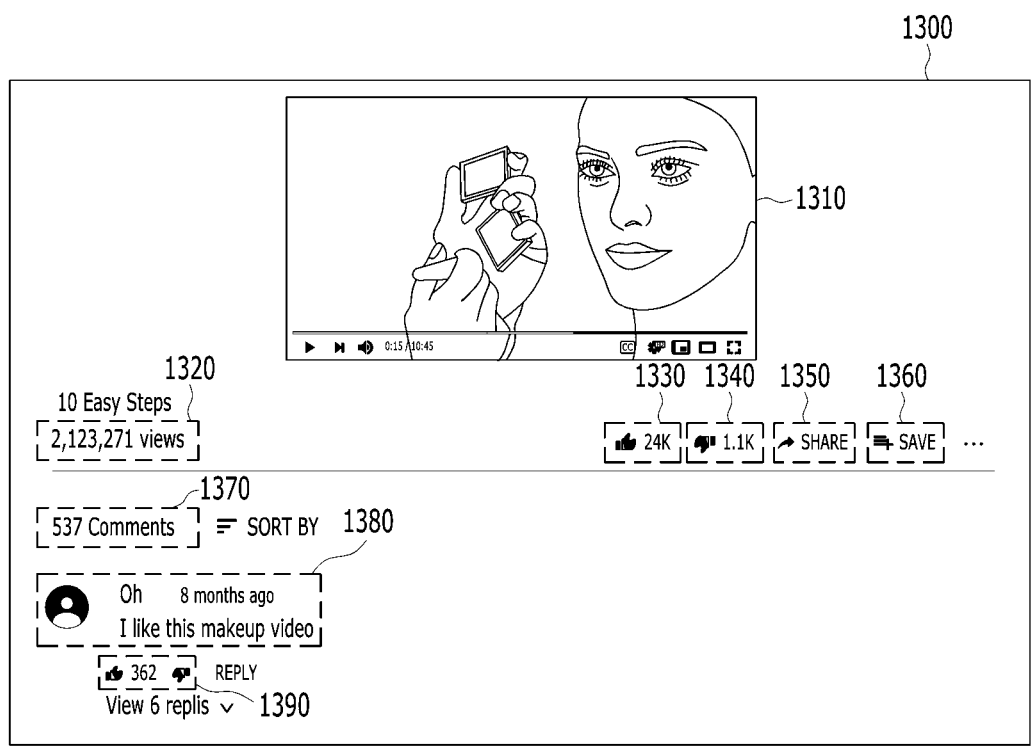
FIG. 11 illustrates an example of a feedback according to an exemplary embodiment of the present disclosure.

Hereinafter, the feedback will be described with reference to FIG. 11. FIG. 11 illustrates an example of a method for determining reliability according to an exemplary embodiment of the present disclosure. FIG. 11 includes a content 1310 displayed on an interface of a user terminal and a screen 1300 displaying a feedback means according to an exemplary embodiment of the present disclosure.

The feedback information for the content 1310 according to an exemplary embodiment of the present disclosure may include data in which a selection input for an interface object indicating affirmation 1330 or denial 1340 for the content 1310 is received from the user terminal using the content 1310. When one user uploads the content 1310, the knowledge sharing platform may provide the user terminal with an interface object that allows other users to give the feedback for the content 1310. The interface object that may allow the users to give the feedback may be, for example, an interface object indicating the affirmation 1330 or the denial 1340. The detailed description of the feedback is just an example and the present disclosure is not limited thereto.

According to an exemplary embodiment of the present disclosure, the process extracting module 130 may determine the reliability for the content 1310 based on the number of selection inputs for the interface object indicating the affirmation 1330 or the denial 1340. According to an exemplary embodiment of the present disclosure, the process extracting module 130 may determine that the reliability for the content 1310 is high when the number of selection inputs for the interface object indicating the affirmation 1330 is equal to or more than a predetermined value. According to another exemplary embodiment of the present disclosure, the process extracting module 130 may determine that the reliability for the content 1310 is low when the number of selection inputs for the interface object indicating the denial 1340 is equal to or more than a predetermined value. According to another exemplary embodiment of the present disclosure, the process extracting module 130 may determine the reliability based on the ratio of the number of selection inputs for the interface object indicating the affirmation 1330 and the number of selection inputs for the interface object indicating the denial 1340. For example, the process extracting module 130 may determine that the reliability for the content 1310 is high when the number of selection inputs for the interface object indicating the affirmation 1330 is equal to or larger than and the number of selection inputs for the interface object indicating the denial 1340 by a predetermined ratio or more. The detailed description of the reliability determination is just an example and the present disclosure is not limited thereto.

According to an exemplary embodiment of the present disclosure, the feedback information for the content 1310 include data in which the contents 1310 are shared or stored by another user. An operation of sharing the content 1310 by another user may mean an operation of sending a link address to access the content 1310 to another user. When one user uploads the content 1310, the knowledge sharing platform may provide the user terminal with an interface object that allows other users to share or store the corresponding content 1310 for the corresponding content 1310. The interface object that may allow the users to give the feedback may be, for example, an interface object indicating sharing 1350 or storing 1360. The detailed description of the feedback is just an example and the present disclosure is not limited thereto.

According to an exemplary embodiment of the present disclosure, the process extracting module 130 may determine the reliability for the content 1310 based on the number of selection inputs for the interface object indicating the sharing 1350 or the storing 1360. According to an exemplary embodiment of the present disclosure, the process extracting module 130 may determine that the reliability for the content 1310 is high when the number of selection inputs for the interface object indicating the sharing 1350 or the storing 1360 is equal to or more than a predetermined value. The detailed description of the reliability determination is just an example and the present disclosure is not limited thereto.

In an exemplary embodiment of the present disclosure, the reliability for the contents may be determined based on the number of inquiries for the contents. The process extracting module 130 may determine the reliability for the contents based on the number of inquires for the contents, a reproduction time of respective users, and the like.

According to an exemplary embodiment of the present disclosure, the feedback information for the content 1310 may include text data 1380 described regarding the content 1310 from the user terminal using the contents. When one user uploads the content 1310, the knowledge sharing platform may provide an interface object to create the text data 1380 so that other users remain an opinion for the content 1310 with respect to the corresponding content 1310. The knowledge sharing platform may receive the text data 1380 about the affirmation or the denial with respect to the content 1310 from the user terminal. The detailed description of the feedback is just an example and the present disclosure is not limited thereto.

According to an exemplary embodiment of the present disclosure, the process extracting module 130 may determine the reliability of the content 1310 based on the text data 1380 received from the user terminal.

According to an exemplary embodiment of the present disclosure, the process extraction module 130 may determine the reliability of the content 1310 based on a quantitative value of the text data 1380 received from the user terminal. For example, the process extracting module 130 may determine that the reliability of the content 1310 is high when a number 1370, which is a quantitative value of the text data 1380 received from the user terminal, is equal to or more than a predetermined value. The detailed description of the reliability determination is just an example and the present disclosure is not limited thereto.

According to another exemplary embodiment of the present disclosure, the process extracting module 130 may determine the reliability of the content 1310 based on contents of the text data 1380 received from the user terminal. The process extracting module 130 may determine the reliability of the content 1310 based on the keyword included in the text data 1380. The process extracting module 130 compares the keywords included in the text data 1380 with an affirmation keyword and a denial keyword stored in the storage space in advance to determine the reliability of the content 1310 based on the ratio of the affirmation keyword and the denial keyword included in the text data 1380. The process extracting module 130 compares the keywords included in the text data 1380 with the affirmation keyword and the denial keyword stored in advance in the storage space to determine that the reliability of the content 1310 is high when the number of affirmation keywords included in the text data 1380 is equal to or more than a predetermined number of times or determine that the reliability of the content 1310 is low when the number of denial keywords included in the text data 1380 is equal to or more than a predetermined number of times. For example, when affirmation keywords including "like", "good", "luv", and the like are derived from the text data 1380 at a predetermined number of times or more, it may be determined that the reliability for the content 1310 is high. Alternatively, the process extracting module 1310 may determine whether the feedback for the text data 1380 is affirmative or denial by processing of a natural language of the text data 1380. Alternatively, when determining the reliability based on two or more text data 1380, the process extracting module 130 gives different weights for each text data 1380 based on the feedback 1390 for the text data 1380 to determine the reliability. The process extracting module 130 may exclude the text data 1380 from the reliability determination of the content 1310, for example, when the feedback 1390 for the text data 1380 is denial. The process extracting module 130 may determine the reliability of the content 1310 by performing calculation by giving a higher weight to the text data 1380, for example, when the feedback 1390 for the text data 1380 is affirmative. The detailed description of the reliability determination is just an example and the present disclosure is not limited thereto.

According to an exemplary embodiment of the present disclosure, the process extracting module 130 may determine the reliability for the content 1310 based on the number of views 1320 for the users for the content 1310 or the number of feedbacks of the users. The number of feedbacks of the users may be, for example, the number of recording times of the text data 1380 of the users, the number of selection inputs of the interface object indicating the affirmation 1330 or the denial 1340, the number of times of sharing 1350 or storing 1360, etc. The process extracting module 130 may determine that the reliability for the content 1310 is high when the number of views 1320 of the users for the content 1310 or the number of feedbacks of the users is equal to or more than a predetermined value.

The process extracting module 130 may separate contents having reliability equal to or higher than a predetermined threshold into one or more subcontents. According to an exemplary embodiment of the present disclosure, the process extracting module 130 may separate contents having reliability which corresponds to a predetermined high rank or contents having reliability equal to or higher than a predetermined value among a plurality of contents identified by the collection module 110 into one or more subcontents. A method for separating the contents into one or more subcontents will be described below in detail.

According to another exemplary embodiment of the present disclosure, the process extracting module 130 may separate the contents in which the reliability for the producer of the contents is equal to higher than a threshold among the contents identified by using the collection module 110 into one or more subcontents.

The process extraction module 130 may identify the feedback information for the producer of the contents. The process extracting module 130 may determine the reliability for the producer for the contents based on the feedback information.

According to an exemplary embodiment of the present disclosure, the feedback information for the producer of the contents may be affirmative or denial feedback information for the producer of the contents. The affirmative feedback information for the content producer may be, for example, a quantitative number of subscribers who subscribe the content producer, an increase rate of the number of subscribers who subscribe the content producer, the number of user terminals set so that an alarm is set in the user terminal when the content producer uploads new contents, and the number of affirmative comments in an Internet community for the content producer. The denial feedback information for the content producer may be, for example, a decrease rate of the number of subscribers who subscribe the content producer and the number of denial comments in the Internet community for the content producer. The detailed description of the feedback information for the content producer is just an example and the present disclosure is not limited thereto.

The process extracting module 130 may determine that the reliability of the content producer is equal to or higher than a threshold when the affirmative feedback information for the content producer is equal to or more than a predetermined threshold. The process extracting module 130 may determine that the reliability of the content producer is equal to or lower than a threshold when the denial feedback information for the content producer is equal to or more than a predetermined threshold. The process extracting module 130 may determine the reliability for the content producer based on the ratio of the affirmative feedback information and the denial feedback information for the content producer. For example, the process extracting module 130 may determine that the reliability of the content producer is high when the affirmative feedback information for the content producer is higher than the denial feedback information at a predetermined ratio or higher.

The process extracting module 130 may separate at least some of the contents of the producer having the reliability equal to or more than the predetermined threshold into one or more subcontents. According to an exemplary embodiment of the present disclosure, the process extracting module 130 may separate all of the contents of the producer having the reliability equal to or higher than the predetermined threshold into one or more subcontents. According to an exemplary embodiment of the present disclosure, the process extracting module 130 may separate some contents of the contents of the producer having the reliability equal to or higher than the predetermined threshold into one or more subcontents. The process extraction module 130 may separate only contents of high rank in which the reliability for the contents is predetermined or contents having the reliability for the contents equal to or higher than a predetermined value among the contents of the producer having the reliability equal to or higher than a predetermined threshold into the subcontents. The detailed description of the content selection is just an example and the present disclosure is not limited thereto.

Hereinafter, the method for separating the contents into one or more subcontents will be described.

The process extracting module 130 may separate contents identified by using the collection module 110 into one or more subcontents. The subcontents may mean at least some contents included in the contents. The contents may include one subcontent or may include two or more subcontents. The subcontents may mean some of processes included in the contents or mean some of objects included in the contents.

Figure 9:
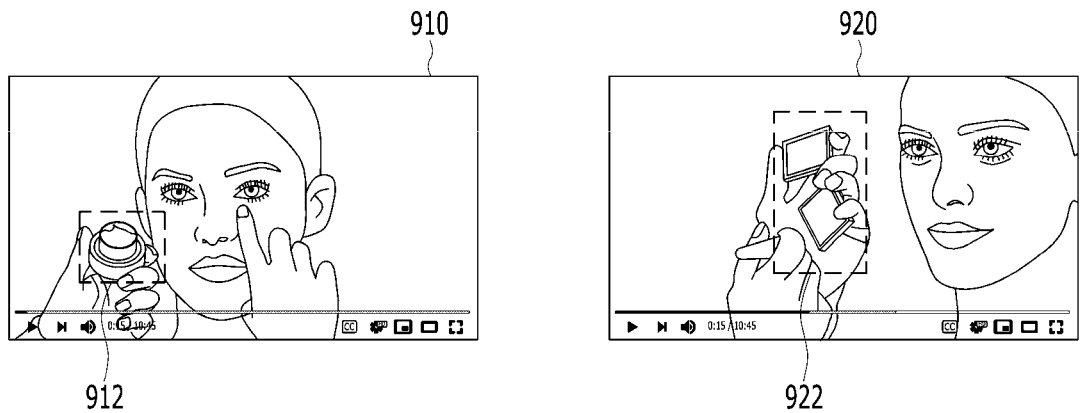
FIG. 9 illustrates an example of subcontents according to an exemplary embodiment of the present disclosure.

A method in which the process extracting module 130 separates the contents into one or more subcontents will be described with reference to FIG. 9. FIG. 9 illustrates an example of subcontents according to an exemplary embodiment of the present disclosure.

The process extracting module 130 may separate the contents into two or more subcontents based on a point at which the context of the contents is changed. The process extracting module 130 may determine contents before the point at which the context of the contents is changed as first subcontents and contents after the point at which the context of the contents is changed as second subcontents. The first subcontents and the second subcontents may be contents related to different categories. Alternatively, the first subcontents and the second subcontents may be contents related to different objects.

The category according to an exemplary embodiment of the present disclosure may be information indicating which category the contents belong to. The category may be, for example, a beauty, an automobile, a trip, a work, an exercise, etc., but this is merely an example and the present disclosure is not limited thereto.

The object according to an exemplary embodiment of the present disclosure may be information indicating which object or object the contents are for. The object may be, for example, a blush, a lipstick, a used car trading method, a contract writing method, etc, but this is merely an example and the present disclosure is not limited thereto.

For example, both first subcontents 910 and second subcontents 920 may belong to a beauty category and the objects may be different as the blush and the lipstick, respectively. Alternatively, the first subcontents and the second subcontents may be different as the beauty category and the automobile category, respectively. The detailed description of the subcontents is just an example and the present disclosure is not limited thereto.

According to an exemplary embodiment of the present disclosure, the process extracting module 130 may determine the point at which the context of the contents is changed by using the video processing algorithm.

The process extracting module 130 may analyze the video included in the contents by using the video processing algorithm. The process extracting module 130 may analyze the video included in the contents by using a video processing model including one or more network functions. The video processing model may be a model based on a Convolution Neural Network (CNN). Alternatively, the video processing algorithm may include canny edge detection, Harris corner detection, and the like. The concrete description of the video processing method is just an example and the present disclosure is not limited thereto.

The process extracting module 130 may determine that the context of the contents is changed based on a change of the object included in the contents. The process extracting module 130 may determine that the context of the contents is changed when some objects of two or more objects recognized to be included in the contents are changed. The process extracting module 130 may determine whether the context of the contents is changed by recognizing two or more objects included in the contents. The process extracting module 130 may determine whether objects corresponding to a predetermined ratio number among two or more objects included in the contents are changed, whether objects of a predetermined number are changed, or whether objects of a predetermined weight or more occupied by a screen are changed. The process extracting module 130 recognizes an object included in a first viewpoint and an object included in a second viewpoint and compares the first viewpoint and the second viewpoint to determine whether the context of the contents is changed by identifying how many objects are changed. For example, even when only one object is changed, if a weight occupied by the object on the screen is large, the process extracting module 130 may determine that the context is changed. Alternatively, even when two or more objects are changed, if a weight occupied by two or more objects on the screen is small, the process extracting module 130 may determine that the context is not changed. The detailed description of the context change is just an example and the present disclosure is not limited thereto.

The process extracting module 130 may separate the contents into two or more subcontents based on the point at which the context is changed. For example, when an object 912 included in a content 910 at the first viewpoint is a cream and an object 922 included in a content 920 at the second viewpoint is the blush, the process extracting module 130 checks that the object is changed to separate the contents into the first subcontents 910 which are a step of applying the cream and second subcontents 920 which are a step of performing blush makeup. The detailed description of the subcontents is just an example and the present disclosure is not limited thereto.

According to an exemplary embodiment of the present disclosure, the process extracting module 130 may determine the point at which the context of the contents is changed by using the video processing algorithm.

The process extracting module 130 may analyze the voice included in the contents by using the voice analyzing algorithm. The voice included in the contents may include the voice of the content producer, the voice of a content photographer, and the like, but this is merely an example, and the present disclosure is not limited thereto.

According to an exemplary embodiment of the present disclosure, the voice processing algorithm may convert the voice included in the contents into the image and calculate the image by using a model including the Convolutional Neural Network. When there is a change in pitch or tone of the voice by a predetermined value or more, it may be determined that the context of the contents is changed. The concrete description of the voice processing is just an example and the present disclosure is not limited thereto.

According to an exemplary embodiment of the present disclosure, the process extracting module 130 may determine that the context of the contents is changed when contexts of two or more keywords included in the voice are changed. For example, if the voice included in the content 910 at the first viewpoint is a keyword related to the cream and basic makeup, and the voice included in the content 920 at the second viewpoint is a keyword related to the blush and color makeup, the process extracting module 130 may determine that the context of the contents is changed. The detailed description of the context change is just an example and the present disclosure is not limited thereto.

The process extracting module 130 may separate the contents into two or more subcontents based on the point at which the context is changed.

According to an exemplary embodiment of the present disclosure, the process extracting module 130 may determine the point at which the context of the contents is changed by using a natural language processing algorithm.

The process extracting module 130 may analyze the text included in the contents by using the natural language analyzing algorithm. When the contents are the video, the text included in the contents may be a text inserted by the content producer into the contents when the content producer produces the contents or a text automatically converted into the caption by the voice included in the contents. The detailed description of the text is just an example and the present disclosure is not limited thereto.

The process extracting module 130 may separate the contents into two or more subcontents based on the point at which the context of the contents is changed when the context of the text included in the contents is changed. The process extracting module 130 may determine that the context of the text included in the video is changed and separate contents for a first point and a second point, respectively into the subcontents, for example, when the text included in the first point of the video is "car repairing" and the text included in the second point is "car scrapping". The detailed description of the subcontents is just an example and the present disclosure is not limited thereto.

The process processing module 150 may tag additional information on the respective processes with respect to the extracted process. The process processing module 150 may tag the additional information to an object included in the video corresponding to the extracted process. The additional information may be additional information related to the process. An operation of tagging the additional information may be an operation of matching and storing the additional information with at least one of the objects included in the process or the video. The additional information may be information provided to the user corresponding to an operation for receiving a user input, for an interface object for requesting the additional information. The additional information may be provided to the user via, for example, a hyperlink. The hyperlink may be an icon, an image, text, etc., which allows moving to another part of a current page (or video) or moving to another page (or another video) based on the input of the user. The process processing module 150 may provide the additional information to the user when receiving the input of the user for the interface object for requesting the additional information of the object included in the process or video. The additional information may include at least one of a URL link, a contact, a map, and an address associated with the process. The URL link may be a link including the additional information on the process. Further, the URL link may be a link for URL that sells items or services associated with the process. Further, the URL link may be a link for connection to another video related to a product or a service related to the process. For example, in the case of the answer for the question associated with the purchasing of a used car, the process processing module 150 may tag a download address of an SK Encar mobile app, an advertisement video link about SK Encar or the URL link of Bobaedream with respect to the "used car searching step" process or tag the additional information including the address of a used car complex, and the like with respect to the "used car complex visiting step" process. Further, the process processing module 150 may tag the URL link of a website that sells car insurance with respect to, for example, an "insurance applying step in purchasing a used car" process. The additional information described above is just an example and the process processing module 150 may tag predetermined additional information. Further, the server 100 may store the collected questions and answers, the category of the answer, the object tagged to the answer, the process, and the tagged additional information in a storage space (not illustrated).

According to an exemplary embodiment of the present disclosure, the process processing module 150 may match and store the additional information with the subcontents.

The additional information may be additional information provided to the user with respect to the subcontents.

Figure 10:
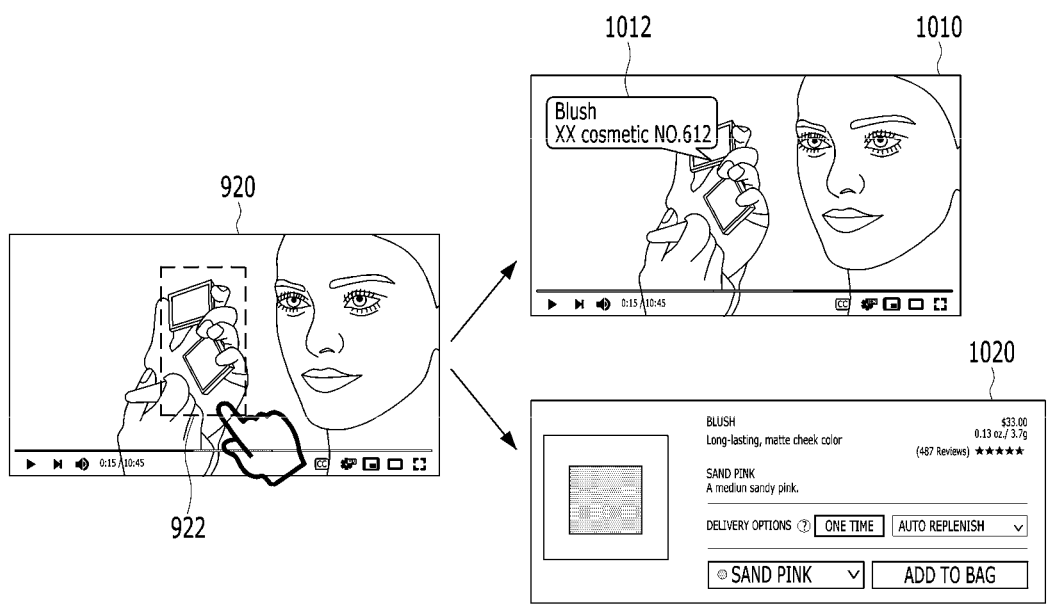
FIG. 10 illustrates an example of additional information according to an exemplary embodiment of the present disclosure.

According to an exemplary embodiment of the present disclosure, the additional information may be information provided in response to the user input when receiving the user input relating to the subcontent interface object from the user terminal. Hereinafter, the additional information will be described below with reference to FIG. 10. FIG. 10 illustrates an example of additional information according to an exemplary embodiment of the present disclosure.

The process processing module 150 may provide additional information when receiving the user input relating to the subcontent interface object included in the subcontents 920 from the user terminal. A human hand shape illustrated in FIG. 10 is auxiliarily illustrated for the description and does not limit the interpretation of the present disclosure. For example, the process processing module 150 may receive the user input for the subcontent interface object from the user terminals of users who desire additional information for the blush in association with the blush which is an object 922 included in the subcontents 920. For example, the subcontent interface object may be in the form of the hyperlink. The process processing module 150 may provide other contents connected to the hyperlink in response to receiving the selection input for the hyperlink of the user terminal. The detailed description of the subcontent interface object is just an example and the present disclosure is not limited thereto.

The additional information may include other new contents. The additional information may be various types of contents for providing information related to the object included in the subcontents. For example, the additional information may be another video, a web site, a map, a contact, an address, a description, and the like, but this is merely an example and the present disclosure is not limited thereto.

The process processing module 150 may provide additional information 1012 in the form of a pop-up within subcontents 1010 according to an exemplary embodiment of the present disclosure. For example, the process processing module 150 may transmit additional information 1012 including a brand and an item number of the blush, as additional information 1012 for the blush to the user terminal so as to be displayed on the screen in the form of the pop-up. The detailed description of the additional information is just an example and the present disclosure is not limited thereto.

The process processing module 150 may provide the additional information 1020 to the user terminal in a separate window from the subcontent 920 according to an exemplary embodiment of the present disclosure. For example, when receiving the user input relating to the subcontent interface object for the blush object, the process processing module 150 may provide to the user terminal the website or the like where the blush may be purchased. For example, the additional information may be videos, photos, etc., related to the subcontents. The detailed description of the additional information is just an example and the present disclosure is not limited thereto.

According to an exemplary embodiment of the present disclosure, the process processing module 150 may match and store at least one of a category of the subcontents or an object related to the subcontents, which is the additional information, with the subcontents.

Figure 12:
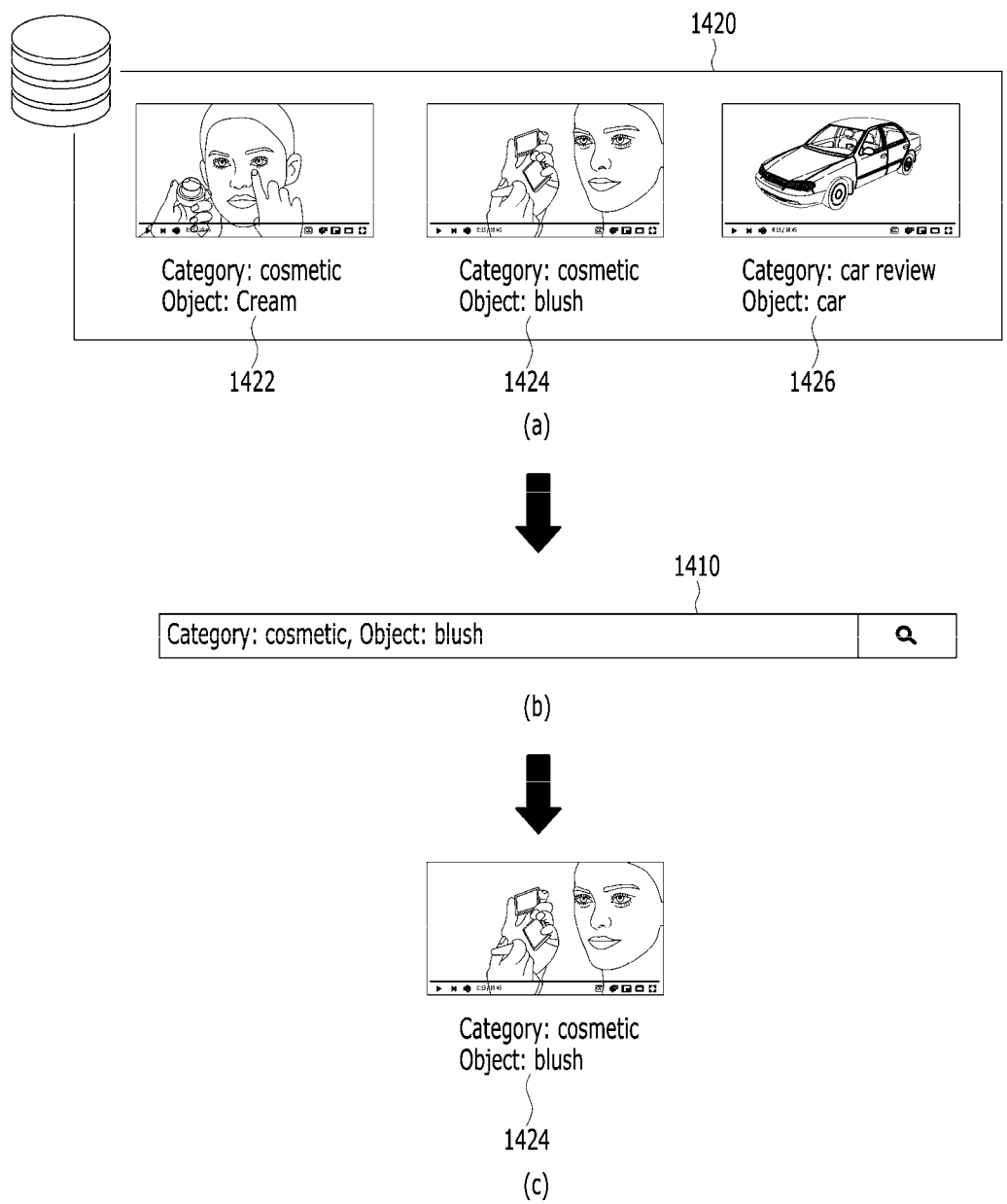
FIG. 12 illustrates an example of a search method according to an exemplary embodiment of the present disclosure.

Hereinafter, a search method will be described. The search method is described with reference to FIG. 12. FIG. 12 illustrates an example of a search method according to an exemplary embodiment of the present disclosure.

The knowledge sharing platform may provide a search interface object 1410 to the user terminal so that users may search for desired contents. The users input search information into the search interface object 1410 to obtain desired contents, subcontents, or additional information related to the subcontents.

Referring to step (a) of FIG. 12, a storage space 1420 may store a plurality of subcontents and additional information matched with the subcontents. For example, each of two or more subcontents stored in the storage space 1420 may be stored with matching categories and objects as additional information. For example, the category for first subcontents 1422 stored in the storage space 1420 may be cosmetic and the object may be cream, the category for second subcontents 1424 may be cosmetic and the object is blush, and the category for subcontents 1426 may be car review and the object may be Ford F150.

Referring to step (b) of FIG. 12, the communication module 170 may receive search information from a user terminal (not illustrated). The communication module 170 may receive search information including at least one of the category and the object from the user terminal. The communication module 170 may receive search information that is the user input for the search interface object 1410 displayed on the user terminal. The communication module 170 may receive category information and the object from the user terminal. The search information may include the category information and the object. For example, as described in the example, the communication module 170 may receive the category information such as "purchase"

and the object such as "used car" from the user terminal. For example, the communication module 170 may receive category information such as "cosmetic" and an object such as "blush" from the user terminal. The user terminal may include a personal computer (PC), a notebook, a mobile terminal, a smart phone, a tablet PC, and the like and includes all kinds of terminals which may access a wired/wireless network. The communication module may include a wired/wireless Internet module for accessing the network. As wireless Internet technology, Wireless LAN (WLAN) (Wi-Fi), Wireless broadband (Wibro), World Interoperability for Microwave Access (Wimax), High Speed Downlink Packet Access (HSDPA), and the like may be used. As wired Internet technology, X Digital Subscriber Line (XDSL), Fibers to the home (FTTH), power line communication (PLC), and the like may be used.

The communication module 170 may provide at least one of the answer, the process, and the tagged additional information corresponding to the search information to the user terminal. For example, the communication module 170 may provide at least one of the answer, the process, and the tagged additional information associated with the used car purchasing as described in the example. The communication module 170 may provide at least one of the answer, the process, and the tagged additional information to the user terminal by using the wired/wireless network.

Referring to step (c) of FIG. 12, the communication module 170 may provide at least one of the contents, the subcontents, or the matched additional information corresponding to the search information to the user terminal. The server 100 may determine the subcontents 1424 corresponding to the search information among two or more subcontents stored in the storage space 1420. The communication module 170 may transmit the subcontents 1424 corresponding to the search information to the user terminal.

The server 100 compares at least one of the category and the object included in the search information with the category or the object matched to each of two or more subcontents stored in the storage space to determine at least one of subcontents having a high matching rate or contents based on the subcontents having the high matching rate. The communication module 170 may transmit the subcontents having the high matching rate or the contents based on the subcontents to the user terminal. Since the category included in the search information received from the user terminal is cosmetic and the object is blush, the server 100 may determine the second subcontents 1424 having a highest matching rate for the category and the object among the first subcontents 1422, the second subcontents 1424, and the third subcontents 1426 as a search result. Alternatively, the server 100 may determine to transmit the contents including the second subcontents 1424 or the additional information stored with matching the second subcontents 1424, to the user terminal. The communication module 170 may transmit at least one of the second subcontents 1424, the contents including the second subcontents 1424, and the additional information stored with matching the second subcontents 1424, to the user terminal. The detailed description of the search is just an example and the present disclosure is not limited thereto.

The server 100 may determine to transmit at least one of contents having reliability equal to or higher than a predetermined value, subcontents based on the contents, and additional information, to the user terminal. The communication module 170 may transmit at least one of contents having reliability equal to or higher than a predetermined value and subcontents, to the user terminal. The communication module 170 may transmit subcontents based on the contents having reliability equal to or higher than a predetermined value, to the user terminal.

According to an exemplary embodiment of the present disclosure, users can perform a search that includes two or more depths. The knowledge sharing platform may provide a search interface object corresponding to two or more depths so that the users may search for desired contents.

The communication module 170 may receive first depth search information from the user terminal. The communication module 170 may receive the first depth search information including at least one of the category and the object from the user terminal. The server 100 compares the first depth search information with two or more contents, sub contents, or matched additional information stored in the storage space to determine the contents, the sub contents, or the matched additional information corresponding to the first depth search information. The communication module 170 may provide at least one of the contents, the subcontents, and the matched additional information corresponding to the first depth search information, to the user terminal.

The communication module 170 may receive second depth search information for the first depth search information, from the user terminal. The users may perform the search again among results according to the first depth search information. The communication module 170 may receive the second depth search information including at least one of the category and the object. The server 100 may determine at least one of contents, subcontents, or matched additional information corresponding to the second depth search information, from the contents, the subcontents, or the matched additional information corresponding to the first depth search information. The communication module 170 may transmit at least one of the contents, the subcontents, and the matched additional information corresponding to the second depth search information, to the user terminal. That is, the users may perform the search once again from the search result.

For example, the communication module 170 may receive the first depth search information including the category from the user terminal. The communication module 170 may receive the first depth search information including "cosmetic" as the category from the user terminal. The server 100 compares two or more subcontents stored in the storage space with the first depth search information to determine at least one of subcontents having a high matching rate, contents based on the subcontents, and additional information. The communication module 170 may transmit a result corresponding to the first depth search information to the user terminal. The user may perform a second depth search in order to view the search result corresponding to "blush" in the "cosmetic" search result. The communication module 170 may receive the second depth search information including "blush" as the object from the user terminal. The server 100 may determine at least one of subcontents having a high matching rate with "blush" in the "cosmetic" search result, contents based on the subcontents, and additional information. The communication module 170 may transmit a search result corresponding to "blush" in the "cosmetic" search result, to the user terminal. The detailed description of the search information is just an example and the present disclosure is not limited thereto.

Figure 13:
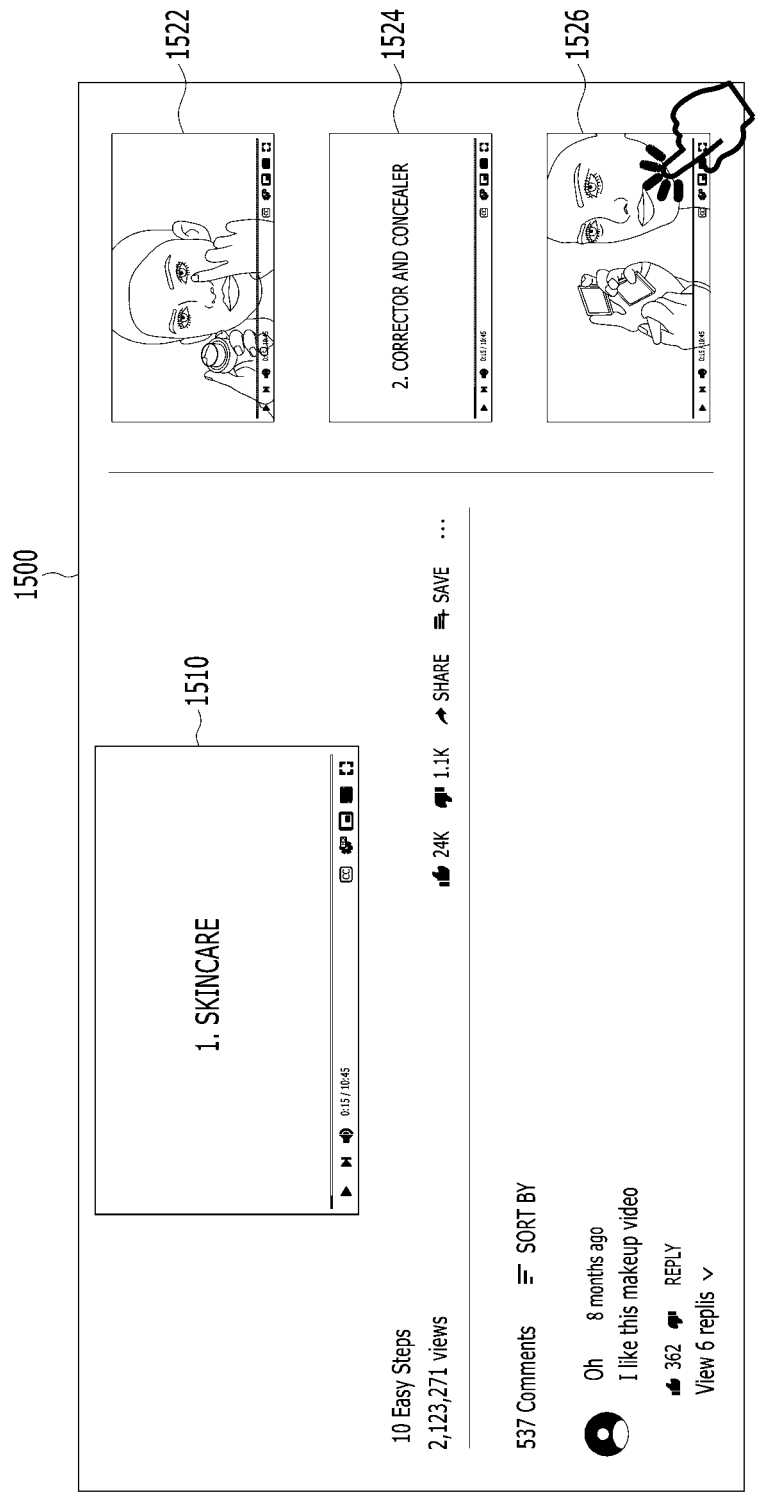
FIG. 13 illustrates an example of contents and subcontents according to an exemplary embodiment of the present disclosure.

Hereinafter, a method for displaying the contents on the user terminal will be described. The method for displaying the contents on the user terminal will be described with reference to FIG. 13. FIG. 13 illustrates an example of contents and subcontents according to an exemplary embodiment of the present disclosure.

The knowledge sharing platform may provide the contents to the users. The knowledge sharing platform transmits information on the contents to the user terminal to display the contents on the screen of the user terminal.

When the communication module 170 receives a selection input for one of two or more contents from the user terminal, the server 100 may determine to transmit information for displaying the contents to the user terminal. A screen 1500 illustrated in FIG. 13 shows an example in which the user views the video through the knowledge sharing platform. The screen displayed on the user terminal illustrated in FIG. 13 is just an example and the present disclosure is not limited thereto. For example, the communication module 170 may receive a selection input for "10 Easy Steps" contents 1510 of two or more contents from the user terminal. The server 100 may determine to display the contents 1510 on the user terminal. The detailed description of the contents is just an example and the present disclosure is not limited thereto.

The communication module 170 may transmit data for displaying the contents and two or more subcontents based on the contents, to the user terminal. Two or more subcontents based on the contents may be data provided based on the input of the user or data basically provided even if there is no input from the user. According to an exemplary embodiment of the present disclosure, when communication module 170 receives the selection input for the contents from the user terminal, the server 100 determines to display the contents and two or more subcontents based on the contents on the user terminal. According to another exemplary embodiment of the present disclosure, when the communication module 170 receives the selection input for the contents from the user terminal, the server 100 allows an interface object which allows the contents to be displayed on the user terminal and the subcontents to be additionally viewed to be displayed on the user terminal. Users who want to further view the subcontents based on the contents may transmit to the knowledge sharing platform the selection input for the interface object which allows the subcontents to be additionally viewed. When the communication module 170 receives the selection input for the interface object which allows the subcontents to be additionally viewed from the user terminal, the server 100 may allow two or more subcontents based on the contents to be displayed on the user terminal.

The communication module 170 may transmit data for displaying two or more subcontents stored in the storage space for the contents on the user terminal. The communication module 170 may transmit data for displaying two or more subcontents stored on the user terminal when subcontents acquired by separating the contents into two or more subcontents are stored in the storage space. The communication module 170 may transmit data for displaying additional information stored in the storage space, which is matched with the subcontents on the user terminal together.

The server 100 may determine to display different types of additional information on the user terminal based on the reliability of the producer of the contents.

A memory may store additional information corresponding to two or more types. Basic additional information may include information that is irrelevant to a monetary interest of additional information related to the process. Commerce additional information may include information that is relevant to the monetary interest of the additional information related to the process. The basic additional information may include, for example, a subtitle of the subcontents, another video irrelevant to the monetary interest, a website address, and the like. The commerce additional information may be, for example, a homepage URL for purchasing the object included in the subcontents, which is relevant to the momentary interest, a promotional phrase of a webpage, which is relevant to the subcontents, etc. Further, for example, the commerce additional information may include an advertisement. The detailed description of the additional information is just an example and the present disclosure is not limited thereto.

The process extracting module 130 may determine the reliability for the producer for the contents to be displayed on the user terminal. As described above, the reliability for the contents may be determined based on the feedback of the user.

According to an exemplary embodiment of the present disclosure, the server 100 may determine to display basic additional information matched with the subcontents on the user terminal when the reliability of the producer of the contents is lower than a predetermined threshold. The communication module 170 may transmit data which allows the basic additional information to be displayed on the user terminal. The server 100 may transmit data for displaying at least one of the basic additional information and the commerce additional information matched with the subcontents on the user terminal when the reliability of the contents for the producer is equal to or higher than a predetermined threshold. The commerce additional information may be provided to the user only for the contents for contents producers having reliability equal to or higher than a predetermined threshold. The detailed description of the contents is just an example and the present disclosure is not limited thereto.

According to another exemplary embodiment of the present disclosure, when the reliability of the contents producer is lower than a predetermined first threshold, the server 100 may not provide the additional information for the contents or the subcontents for the corresponding contents producer to the user terminal. The server 100 may determine to display the basic additional information on the user terminal for the contents of the corresponding contents producer when the reliability for the contents producer is equal to or higher than the predetermined first threshold and lower than a predetermined second threshold. The communication module 170 may transmit data which allows the basic additional information to be displayed on the user terminal. The server 100 may determine to display, on the user terminal, at least one of the basic additional information and the commerce additional information for the contents of the corresponding contents producer when the reliability of the contents producer is equal to or higher than the predetermined second threshold. The communication module 170 may transmit data which allows at least one of the basic additional information and the commerce additional information to be displayed on the user terminal.

According to an exemplary embodiment of the present disclosure, the basic additional information may be information displayed together with the subcontents on the user terminal, even when there is no separate selection input of the user. For example, the server 100 may allow the basic additional information to be displayed on one side of the subcontents or one side other than the subcontents in the user terminal. The commerce additional information may be information displayed together with the subcontents on the user terminal, even when there is a separate selection input of the user. For example, even in the case of the subcontents for the contents producer having the reliability equal to or higher than the predetermined second threshold, only the basic additional information may be provided to a basic screen. In addition, when the communication module 170 receives the selection input for a user interface object for requesting the commerce additional information from the user terminal, the server 100 may determine to additionally display the commerce additional information on the user terminal. The communication module 170 may transmit to the user terminal information for displaying the commerce additional information on the user terminal. The detailed description of the additional information is just an example and the present disclosure is not limited thereto.

The server 100 may allow the contents to be displayed on one side of the screen 1500 displayed on the user terminal and two or more subcontents based on the contents to be displayed on the other side. For example, the "10 Easy Steps" contents 1510 are separated to store first subcontents 1522 of a basic makeup step, second subcontents 1524 of a concealer makeup step, and third subcontents 1526 of a color makeup step in the storage space. The server 100 may determine to display the subcontents and the stored additional information matched with the subcontents on the user terminal. The communication module 170 may transmit data which allows the subcontents or the additional information to be displayed on the user terminal. The detailed description of the subcontents is just an example and the present disclosure is not limited thereto.

The communication module 170 may receive the selection input for one of the two or more subcontents from the user terminal. The server 100 may determine to display the one subcontent and the additional in formation stored with matching the one subcontent on the user terminal instead of the contents. For example, as illustrated in FIG. 13, when the user desires to view the third subcontents of the first subcontents, the second subcontents, and the third subcontents acquired by separating the contents, the user may transmit data by clicking on or touching with a hand a display object corresponding to the third subcontents. The shape of the human hand illustrated in FIG. 13 is just an auxiliary means for describing the disclosure and the present disclosure is not limited thereto. When the communication module 170 receives the selection input for the third subcontents on the screen 1500, the server 100 may determine to display the video corresponding to the third subcontents, the third subcontents, and the additional information stored with matching the third subcontents on the user terminal instead of the contents. For example, when the user clicks on the third subcontents while watching the video corresponding to 00 minute and 43 seconds of the contents, since the video corresponding to the third subcontents is 3 minutes 50 seconds to 4 minutes 03 seconds, the video from 3 minutes and 50 seconds may be displayed on the user terminal. The detailed description of the method for displaying the contents, the subcontents, and the additional information on the user terminal is just an example and the present disclosure is not limited thereto.

Figure 2:
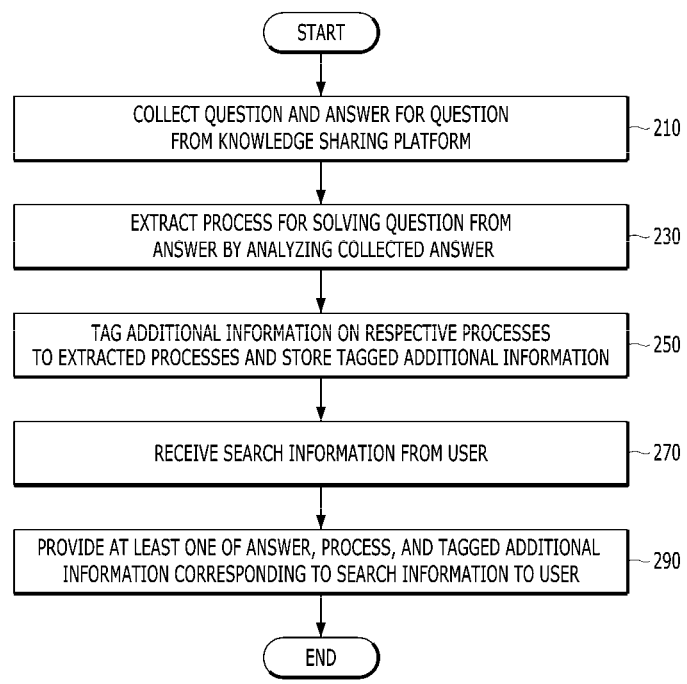
FIG. 2 is a flowchart of a method for providing knowledge based e-commerce according to an exemplary embodiment of the present disclosure.

FIG. 2 is a flowchart of a method for providing knowledge based e-commerce according to an exemplary embodiment of the present disclosure.

The server 100 may collect the question and the answer for the question from the knowledge sharing platform (210). The knowledge sharing platform may be a platform of a type in which the users arbitrarily ask questions and answerers arbitrarily answers the questions. Further, according to an exemplary embodiment of the present disclosure, the knowledge sharing platform may be a platform for uploading the video including the question or the answer. Further, in the exemplary embodiment of the present disclosure, the knowledge sharing platform may be a knowledge sharing platform in which the answer is input to be separated for each process. Further, as described above, the questions and the answers according to the exemplary embodiment of the present disclosure may include at least contents associated with e-commerce. The server 100 may extract the process for solving the question from the answer by analyzing the collected answer (230). Further, the server 100 may determine the category of at least one of the collected question and answer and tag the object to at least one of the question and the answer. The server 100 may determine at least one category of the question and the answer included in the collected video and tag the object to at least one of the question and the answer.

For example, in the case of the question associated with the used car purchasing, the category of the question may be determined as "purchase" and the object may be "used car". In more detail, for the question "What is the present price of a used car such as an AVANTE XD 2006? The AVANTE XD 2006 is scheduled to be purchased", the server 100 may determine the category of the question as "purchase". Further, the server 100 may tag the object such as "used car" to the question. For example, as described above, in the case of a question associated with used car purchasing, the category of the answer may be determined as "purchase" and the object may be "used car". Further, the server 100 may extract the process of "used car purchasing" by analyzing the answer. The extracted process may be processes including "used car searching step", "used car complex visiting step", "vehicle checking step before the contract", "contract step", "transfer step", and the like. The detailed description of the process separation is just an example and the present disclosure is not limited thereto.

For example, in the case of a video related to a question and an answer related to the purchase of the used car, the server 100 may determine the category of the question as "purchase" and determine the object as "used car". The server 100 analyzes the answer included in the video to extract the process of "purchase of used car". For example, the server 100 may separate the answer included in the video into processes such as "used car search step" from 0 minute and 34 seconds to 1 minute and 02 seconds and "vehicle checking step before contract" from 1 minute and 03 seconds to 1 minute and 37 seconds. Further, for example, the server 100 analyzes the answers included in the video to separate the video of a part where the object for the search window is identified into the process such as "used car search step" and the video of a part where an object for an operation of picking up the vehicle with a camera is identified into the process such as "vehicle checking step before contract". The detailed description of the process separation is just an example and the present disclosure is not limited thereto.

The server 100 may tag the additional information on the respective processes to the extracted processes and store the tagged additional information (250). The server 100 may tag the additional information on the object included in the video corresponding to the process. As described above, the additional information may include at least one of a URL link, a contact, a map, and an address associated with the process.

The tagged additional information may be determined based on the reliability of the contents or the contents producer. For example, the basic additional information may be tagged when the reliability of the contents or the contents producer is equal to or lower than a predetermined value. The basic additional information may include information that is irrelevant to the monetary interest of additional information related to the process. For example, the commerce additional information may be tagged when the reliability of the contents or the contents producer is higher the predetermined value. The commerce additional information may include information that is relevant to the monetary interest of the additional information related to the process. The basic additional information may include, for example, a subtitle of the subcontents, another video irrelevant to the monetary interest, a website address, and the like. The commerce additional information may be, for example, a homepage URL for purchasing the object included in the subcontents, which is relevant to the momentary interest, a promotional phrase of a webpage, which is relevant to the subcontents, etc. Further, for example, the commerce additional information may include an advertisement. The detailed description of the additional information is just an example and the present disclosure is not limited thereto.

For example, as described above, in the case of the question associated with the used car purchasing, the server 100 may tag the additional information such as the download links of the SK Encar mobile app, an advertisement video link for SK Encar, or the like with respect to the process of "used car searching step". For example, the server 100 may tag the additional information by inserting an advertisement video hyperlink related to the SK Encar into a video part corresponding to the process of "used car search step". Alternatively, for example, in the case of a question concerning the cosmetics, the server 100 clicks on the "blush" object included in the video in the video part corresponding to the process of "blush makeup step" to tag additional information to move to a site where the blush may be purchased.

The server 100 may receive the search information from the user terminal (270). To this end, the server 100 may include the wired/wireless Internet module for accessing the network. Further, the server 100 may receive the category information and the object from the user terminal. The server 100 may receive the search information to search the answer, the process, and the tagged additional information from the user terminal.

The server 100 may provide at least one of the answer, the process, and the tagged additional information corresponding to the search information to the user terminal (290). The server 100 may provide at least one of the answer, the process, and the tagged additional information corresponding to the search information to the user terminal through the network. For example, the server 100 may provide at least one of one part of the video including the answer corresponding to the search information, at least one object included in the video corresponding to the answer, and additional information tagged with respect to the video to the user terminal.

Figure 3:
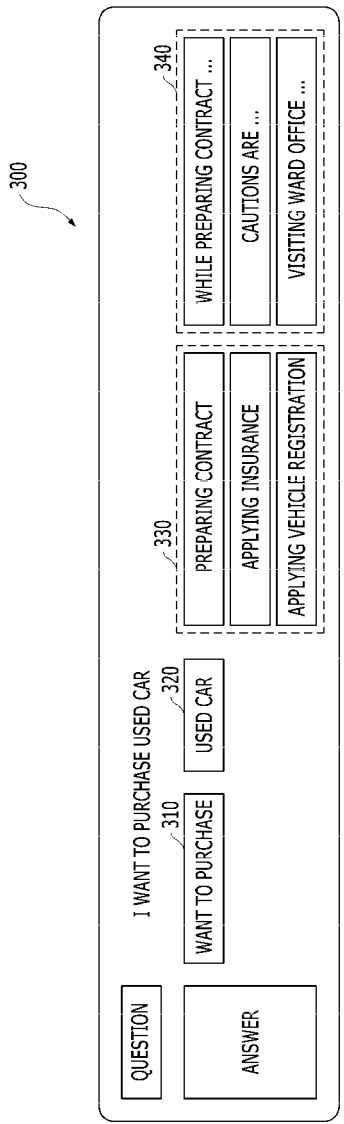
FIG. 3 illustrates an example of an analysis data table of a question and an answer which are collected according to an exemplary embodiment of the present disclosure.

FIG. 3 illustrates an example of an analysis data table of a question and an answer which are collected according to an exemplary embodiment of the present disclosure.

An analysis data table of the collected question and answer according to the exemplary embodiment of the present disclosure may include a category 310, an object 320, a process 330, and detailed contents 340 of the process in the answer.

The category 310 of the answer may be a category associated with a type of wants of the questioner and the answerer. As described above, the questions and the answers according to the present disclosure may include at least contents associated with e-commerce. The type of the want of the questioner or answerer associated with e-commerce may be associated with purchasing, selling and manufacturing of items or purchasing and selling of services. Therefore, the category 310 may classify the type of the want of the questioner or the answerer into "want to purchase", "want to sell", "want to make", and the like. "Target" may be present in the want of the questioner or answerer and the target of the want may become the object 320. The answerer may answer a process for satisfying the want of the questioner and such a process may become the process 330. The process 330 may include the detailed contents 340 of the process for each process. The detailed contents 340 of the process may include contents to separate the answer prepared by the answerer for each process.

In the example illustrated in FIG. 3, when the question is "I want to purchase the used car" and the answer is contents associated with the process of purchasing the used car, the want of the user is "want to purchase" in the answer, therefore, the category of the answer may become "purchase". Further, the answer is contents associated with the process of purchasing the "used car" and the object 320 of the want such as the "purchase" may become the "used car". The answerer may answer the process of purchasing the used car and in the example illustrated in FIG. 3, as the process of purchasing the used car, "contract preparing step", "insurance applying step", and "vehicle registration applying step" may become the process 330 of purchasing the used car. Alternatively, in another example, when the server 100 collects the videos for the question and the answer in the knowledge sharing platform, the server 100 may perform the analysis for the question and the answer based on the videos. The server 100 may extract the process 330 described in the example by analyzing the answer.

Figure 4:
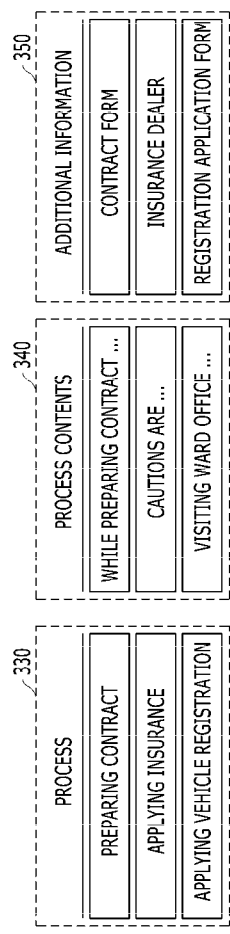
FIG. 4 illustrates an example of analysis of an answer according to an exemplary embodiment of the present disclosure.

FIG. 4 illustrates an example of analysis of an answer according to an exemplary embodiment of the present disclosure.

FIG. 4 illustrates a more detailed example of analyzing an answer and separating the answer into processes according to an exemplary embodiment of the present disclosure.

FIG. 4 illustrates an example of analyzing the answer for the question such as "I want to purchase the used car" as illustrated in FIG. 3. As illustrated in FIG. 4, The answerer may answer the process of purchasing the used car for the question such as "I want to purchase the used car" and in the example illustrated in FIG. 4, as the process of purchasing the used car, the "contract preparing step", the "insurance applying step", and the "vehicle registration applying step" may become the process 330 of purchasing the used car. The detailed contents 340 of the process may include contents to separate the answer contents prepared by the answerer for each process described above. Further, the server 100 may tag the additional information 350 with respect to the respective processes. As described above, the additional information 350 on the process may include at least one of the URL link, the contact, the map, and the address associated with the process.

In the example of FIG. 4, the detailed contents 340 of the process, which may include contents including cautions while preparing the contract such as "while preparing the contract" prepared by the answerer, are present in the "contract preparing" process 330. The detailed contents 340 of the process for the process 330 such as "preparing the contract" may be a video including contents including cautions while preparing the contract. The server 100 may tag the additional information 350 for each separated process 330 and additional information to the "contract preparing" process 330 may become a download link of "contract form" or a link for accessing the video related to the contract preparing. The process, the detailed contents, and the additional information described above are just examples and the present disclosure may include a predetermined process, predetermined process detailed information, and predetermined additional information.

FIG. 5 illustrates a more detailed example of analysis of an answer according to an exemplary embodiment of the present disclosure.

FIG. 5 illustrates the answer, the keyword, and the detailed contents of the process. In FIG. 5, the text following "Hi! This is *** a used car used car salesman." corresponds to the answer. The server 100 may analyze the answer. Recommending the answer may be a feedback for the answer. The server 100 may collect the answer, extract the keyword from the answer, and extract the process for solving the question. In the FIG. 5, "If your car is not a private sale, you should go to a used car dealing complex. When you go to the dealing complex, you should first prepare a contract after checking the interior and the exterior of a vehicle, sufficiently performing test-drive, and accurately receiving a notification of whether an accident occurs in the corresponding vehicle and a vehicle performance record. If you pay a vehicle payment, an acquisition/registration tax, and a used car dealing fee (selling fee, a commission fee, and the like), the used car dealing complex will deputize vehicle transfer. In association with insurance, a military driving carrier does not apply to you and you will be regarded as new application. When you apply self-vehicle insurance, an insurance premium will be approximately 2 million won." corresponds to the answer. Herein, "vehicular interior/exterior 331", "test drive 332", "insurance associated matters 333", and "knack or cautions 334" may correspond to the keyword. The server 100 analyzes the answer to divide the answer into the process 330 such as "step of checking the vehicular interior/exterior", "test drive step", "insurance applying step", and "other cautions step".

In the answer of FIG. 5, "Since the vehicle is expensive, you should check the vehicle with your eyes, sufficiently perform the test drive, and receive the notification of the vehicle performance record and carefully check what an accident range is or whether the vehicle is completely repaired if the accident occurs in the vehicle. I hope you to purchase a best car. (341)" as the answer may correspond to the detailed contents 340 of the process of the "other cautions step".

Figure 6:
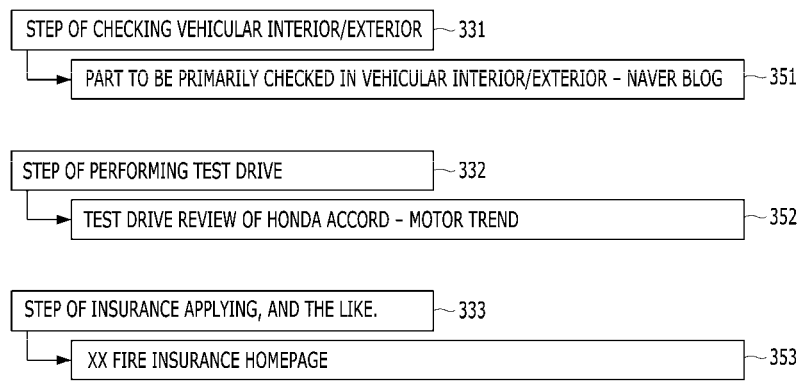
FIG. 6 illustrates an example of additional information of an analyzed answer according to an exemplary embodiment of the present disclosure.

FIG. 6 illustrates an example of additional information of an analyzed answer according to an exemplary embodiment of the present disclosure.

FIG. 6 illustrates an example of additional information tagged for each process of the answer analyzed in FIG. 5. In FIG. 5, the server 100 may divide the answer into the process 330 such as the "step of checking the vehicular interior/exterior", the "test drive step", the "insurance applying step", and the "other cautions step".

In this case, the server 100 may tag a link of a blog web document associated with "a part to be primarily checked in the interior/exterior of the vehicle" in a special blog for the vehicle or a link for accessing a video for describing a part to be primarily checked in the exterior of the vehicle, with respect to the "step of checking the vehicular interior/exterior". Therefore, the user may easily obtain detailed information including "information on a place which becomes rusty on the bottom of a vehicle body, and the like", "method for finding a trace of the accident", and the like in the "step of checking the vehicular interior/exterior". For example, when the answer is described only by a word, the additional information is transferred to the user through a photograph or the video to allow the user to cleverly and conveniently perform a desired dealing action by better understanding answer contents.

The server 100 may tag a link of "a test-drive review" document loaded in an automobile magazine or a link for accessing a video acquired by photographing the test-driver review of the car with respect to the "step of perform the test drive". Therefore, the user may more easily obtain detailed information regarding check points while test-driving the vehicle, and the like.

The server 100 tags the URL link of a fire insurance homepage or a link for accessing an insurance applying related promotional video, with respect to the "step of applying for insurance, and the like" to allow the user to more easily verify insurance information and easily apply for insurance, thereby accurately and conveniently satisfy the want of the user. Additional information associated with a business such as an insurance company homepage may be tagged to a corresponding company by receiving a predetermined advertisement fee.

Figure 7:
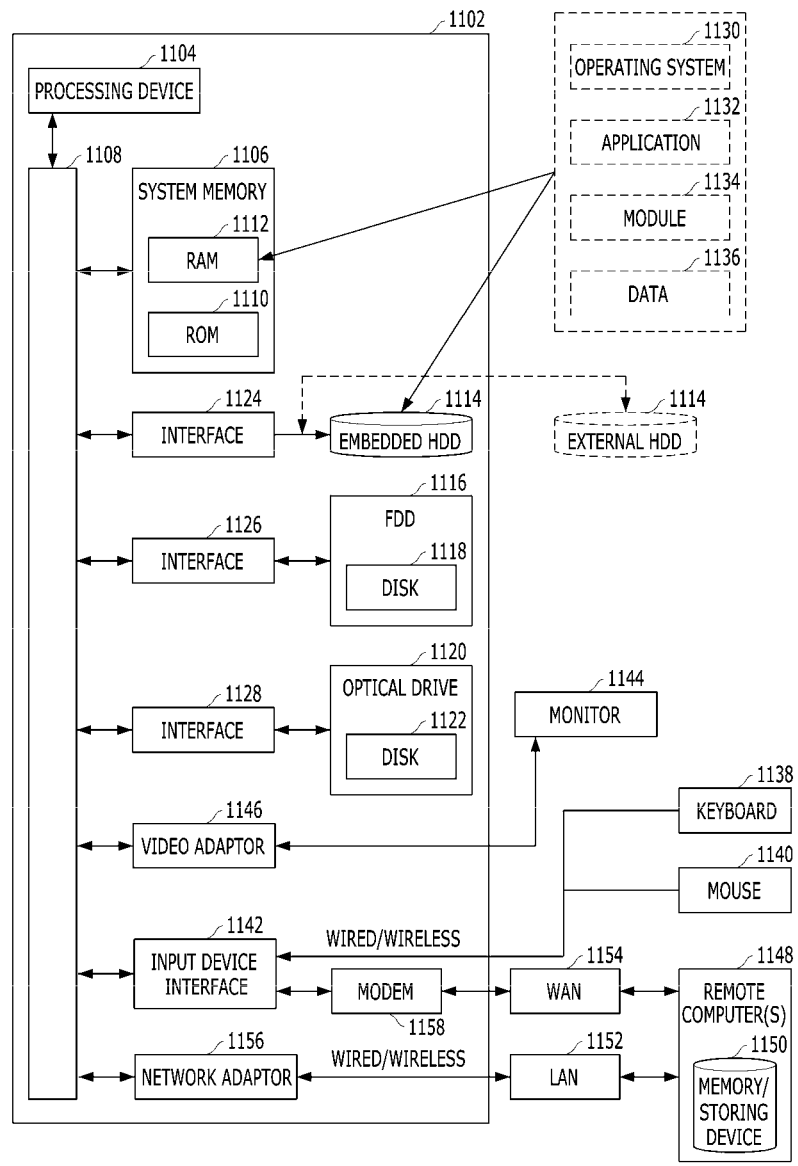
FIG. 7 is a block diagram of a computer which performs an operation of executing a computer program for providing knowledge based e-commerce according to an exemplary embodiment of the present disclosure.

FIG. 7 is a block diagram of a computer which performs an operation of executing a computer program for providing knowledge based e-commerce according to an exemplary embodiment of the present disclosure.

Referring to FIG. 7, simple and general description of an appropriate computing environment in which various aspects of an exemplary embodiment according to the present disclosure may be implemented may be provided.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices)) as well as a single-processor or multi-processor computer system, a mini computer, and a main frame computer.

The aspects described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, and mobile and non-mobile media. As not a limit but an example, the computer readable medium may include both a computer storage medium and a communication medium. The computer storage medium includes all of the volatile and non-volatile and the mobile and non-mobile media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing one or more of characteristics of the signal so as to encode information in the signal. As not a limit but an example, the communication media include wired media such as a wired network or a direct-wired connection and wireless media such as acoustic, RF, infrared and other wireless media. A combination of any media among the aforementioned media is also included in the range of the computer readable media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication server on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some aspect thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example the printer, a scanner, a desktop and/or portable computer, a portable data assistant (PDA), a communication satellite, predetermined equipment or place (for example, a kiosk, a newsstand, and a toilet) associated with a wireless detectable tag, and a telephone. This at least includes Wi-Fi and a Bluetooth™ wireless technology. Accordingly, communication may be a predefined structure like the network in the related art or just ad hoc communication between at least two devices.

Wireless fidelity (Wi-Fi) enables connection to the Internet, and the like from a sofa of a home, a bed of a hotel room, or a conference room of an office without a wired cable. Wi-Fi is a wireless technology such as a device, for example a cellular phone, which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands), therefore, the network may provide actual performance similar to a basic 10BaseT wired Ethernet network used in a lot of offices.

Figure 8:
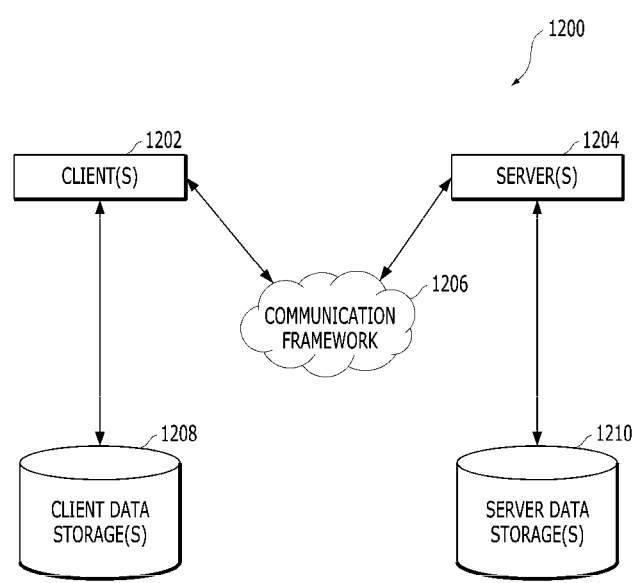
FIG. 8 is a schematic block diagram of an exemplary computing environment that executes a computer program for providing knowledge based e-commerce according to an exemplary embodiment of the present disclosure.

FIG. 8 is a schematic block diagram of an exemplary computing environment that executes a computer program for providing knowledge based e-commerce according to an exemplary embodiment of the present disclosure.

Referring to FIG. 8, a system 1200 includes one or more client(s) 1202. The client(s) 1202 may be hardware and/or software (for example, a thread, a process, and a computing device). The client(s) 1202 may, for example, keep a cookie(s) and/or associated situational information by using the present disclosure.

The system 1200 also includes one or more server(s) 1204. The server(s) 1204 may also be the hardware and/or software (for example, the thread, the process, and the computing device). The server 1204 may, for example, keep the thread which performs conversion by using the present disclosure. One available communication between the client 1202 and the server 1204 may be a form of a data packet configured to be transmitted among two or more computer processes. The data packet may include, for example, the cookie(s) and/or the associated situational information. The system 1200 includes a communication framework 1206 (for example, a global communication network such as Internet, and the like) which may be used for facilitating communications between the client(s) 1202 and the server(s) 1204.

Wired (including an optical fiber) and/or wireless technology may facilitate the communication. The client(s) 1202 operate(s) in connection with one or more client data storage(s) 1208 which may be used for storing information (for example, the cookie(s) and/or the associated situational information) which is local to the client(s) 1202. Similarly to this, the server(s) 1204 operate(s) in connection with one or more server data storage(s) 1210 which may be used for storing information which is local to the servers 1204.

The components include the examples of the present disclosure. Of course, it is not possible to describe all considerable combinations of components or methods for the purpose of describing the present disclosure, but it will be appreciated by those skilled in the art that a lot of additions of the present disclosure can be combined or replaced. Therefore, the present disclosure is used for embracing all of the changes, modifications, and transformations included in the spirit and the scope of the appended claims. Moreover, it is construed that up to a degree in which a term "include" is used in any one of the detailed description and the claims, when the term is used as a transitional word in the claims, the term is interpreted in a similar manner to the term "comprising".

The present disclosure has been described with reference to the preferred embodiments. However, it will be appreciated by those skilled in the art that various modifications and changes of the present disclosure can be made without departing from the spirit and the scope of the present disclosure which are defined in the appended claims and their equivalents.

What is claimed is:

1. A non-transitory computer readable medium storing a computer program, wherein when the computer program is executed by one or more processors of a computing device, the computer program performs operations for analyzing contents, and the operations include:
analyzing, with a question and answer module, a text included in the contents using a natural language analysis algorithm to identify one or more subcontents in an answer collected by the question and answer module;
storing an additional information with the subcontents;
receiving search information from a user terminal; and
sending at least one of the contents, the subcontents or the additional information corresponding to the search information to the user terminal, wherein the analyzing a text included in the contents using a natural language analysis algorithm includes:
analyzing a text included in the contents using a natural language analysis algorithm, and
separating the contents into two or more subcontents based on a context change point of the contents based on a change of a context of the text included in the contents.

2. The non-transitory computer readable medium according to claim 1, wherein the contents include at least one of video or question and answer text.

3. The non-transitory computer readable medium according to claim 1, wherein the analyzing a text included in the contents using a natural language analysis algorithm includes:
separating the contents into two or more subcontents based on a point at which a context of the contents is changed.

4. The non-transitory computer readable medium according to claim 1, wherein the analyzing a text included in the contents using a natural language analysis algorithm includes:
analyzing a video included in the contents using an image processing algorithm;

determining that a context of the contents has changed based on a change of an item included in the contents; and separating the contents into two or more subcontents based on a point at which a context is changed.

5. The non-transitory computer readable medium according to claim 1, wherein the analyzing a text included in the contents using a natural language analysis algorithm includes:

analyzing an audio signal included in the contents using an audio analyzing algorithm;

determining that a context of the contents has changed based on a change of a context of two or more keywords included in a voice; and separating the contents into two or more subcontents based on a point at which a context is changed.

6. The non-transitory computer readable medium according to claim 1, wherein the additional information is an additional information provided to the user terminal regarding the subcontents.

7. The non-transitory computer readable medium according to claim 1, wherein the additional information is an information that is provided corresponding to a user input if the user input relating to a subcontents interface object is received from the user terminal.

8. The non-transitory computer readable medium according to claim 1, wherein the additional information includes at least one of a category of the subcontents or an object related to the subcontents.

9. The non-transitory computer readable medium according to claim 1, wherein the analyzing a text included in the contents using a natural language analysis algorithm includes:

identifying a feedback information about the contents;

determining reliability of the contents based on the feedback information; and separating the contents having the reliability equal to or higher than a predetermined threshold into one or more subcontents.

10. The non-transitory computer readable medium according to claim 9, wherein the feedback information includes at least one of data receiving a selection input for an interface object indicating affirmation or denial of the contents which is received from a user terminal, or a text data describing the contents received from the user terminal.

11. The non-transitory computer readable medium according to claim 1, wherein the analyzing a text included in the contents using a natural language analysis algorithm includes:

identifying a feedback information about a producer of the contents;

determining reliability of the producer of the contents based on the feedback information; and separating the contents of the producer having the reliability equal to or higher than a predetermined threshold into one or more subcontents.

12. The non-transitory computer readable medium according to claim 1, wherein receiving search information from a user terminal includes:

receiving search information including at least one of a category or an object, and wherein sending at least one of the contents, the subcontents or the additional information corresponding to the search information to the user terminal includes:

comparing at least one of the category or the object included in the search information with a category or an object which is matched to each of two or more subcontents which are stored in a storage; and transmitting at least one of subcontents having a high matching rate or contents based on the subcontents having a high matching rate.

13. The non-transitory computer readable medium according to claim 1, wherein sending at least one of the contents, the subcontents or the additional information corresponding to the search information to the user terminal includes:

transmitting at least one of contents or subcontents having reliability equal to or higher than a predetermined threshold.

14. The non-transitory computer readable medium according to claim 1, wherein the operations further include:

transmitting data to the user terminal to display the contents and two or more subcontents based on the contents.

15. The non-transitory computer readable medium according to claim 14, wherein the operations further include:

receiving a selection input relating to one subcontent of the two or more subcontents from the user terminal; and transmitting data to display the one subcontent and additional information which is matched to the one subcontent and stored in a storage to the user terminal.

16. The non-transitory computer readable medium according to claim 14, wherein the operations further include:

transmitting data to the user terminal to display basic additional information matched to subcontents to the user terminal, if a reliability of a producer of the contents is less than a predetermined threshold; and transmitting data to the user terminal to display at least one of basic additional information or commerce additional information matched to subcontents to the user terminal, if the reliability of a producer of the contents is equal to or higher than a predetermined threshold.

17. A method for analyzing contents executed by a computing device comprising one or more processors, comprising:

analyzing by the one or more processors, with a question and answer module, a text included in the contents using a natural language analysis algorithm to identify one or more subcontents in an answer collected by the question and answer module;

storing an additional information with the subcontents;

receiving search information from a user terminal; and sending at least one of the contents, the subcontents or the additional information corresponding to the search information to the user terminal, wherein the analyzing a text included in the contents using a natural language analysis algorithm includes:

analyzing a text included in the contents using a natural language analysis algorithm, and separating the contents into two or more subcontents based on a context change point of the contents based on a change of a context of the text included in the contents.

18. A server for analyzing contents, comprising:

a processor including one or more cores; and a memory;

wherein the processor is configured to analyze, with a question and answer module, a text included in the contents using a natural language analysis algorithm to identify one or more subcontents in an answer collected by the question and answer module;

store an additional information with the subcontents;

receive search information from a user terminal; and send at least one of the contents, the subcontents or the additional information corresponding to the search information to the user terminal, wherein the processor is further configured to:

when analyzing a text included in the contents using a natural language analysis algorithm, analyze a text included in the contents using a natural language analysis algorithm, and separate the contents into two or more subcontents based on a context change point of the contents based on a change of a context of the text included in the contents.

* * * * *